United States Patent
Hida et al.

(10) Patent No.: US 8,775,739 B2
(45) Date of Patent: Jul. 8, 2014

(54) MEMORY SYSTEM INCLUDING FIRST AND SECOND CACHES AND CONTROLLING READOUT OF DATA THEREFROM

(75) Inventors: Toshikatsu Hida, Kanagawa (JP);
Norikazu Yoshida, Kanagawa (JP);
Kouji Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 13/326,929

(22) Filed: Dec. 15, 2011

(65) Prior Publication Data

US 2012/0159072 A1    Jun. 21, 2012

(30) Foreign Application Priority Data

Dec. 17, 2010 (JP) ................................. 2010-282442

(51) Int. Cl.
*G06F 12/08* (2006.01)
*G06F 12/02* (2006.01)
*G06F 3/06* (2006.01)

(52) U.S. Cl.
CPC ........ *G06F 12/0862* (2013.01); *G06F 12/0246* (2013.01); *G06F 3/0679* (2013.01)
USPC ............................ 711/118; 711/103; 711/213

(58) Field of Classification Search
CPC   G06F 12/0862; G06F 12/0246; G06F 3/0679
USPC ......................................... 711/103, 118, 213
See application file for complete search history.

(56) References Cited

U.S. PATENT DOCUMENTS

| 7,953,920 | B2 | 5/2011 | Yano et al. |
| 7,962,688 | B2 | 6/2011 | Yano et al. |
| 8,065,470 | B2 | 11/2011 | Yano et al. |
| 8,065,471 | B2 | 11/2011 | Yano et al. |
| 2008/0177975 | A1* | 7/2008 | Kawamura ..................... 711/173 |
| 2009/0222628 | A1 | 9/2009 | Yano et al. |
| 2009/0222629 | A1* | 9/2009 | Yano et al. ..................... 711/137 |
| 2010/0169549 | A1 | 7/2010 | Yano et al. |
| 2012/0127794 | A1* | 5/2012 | Moschiano et al. ..... 365/185.12 |

FOREIGN PATENT DOCUMENTS

| JP | H03-102443 | 4/1991 |
| JP | 2001-51896 | 2/2001 |
| JP | 2003-177961 | 6/2003 |
| JP | 2006-323739 | 11/2006 |

(Continued)

OTHER PUBLICATIONS

Office Action mailed Apr. 30, 2014, in Japanese Patent Application No. 2010-282442 (with English-language translation).

*Primary Examiner* — Than Nguyen
(74) *Attorney, Agent, or Firm* — Oblon, Spivak, McClelland, Maier & Neustadt, L.L.P.

(57) ABSTRACT

According to one embodiment, a memory system includes a chip including a cell array and first and second caches configured to hold data read out from the cell array; an interface configured to manage a first and a second addresses; a controller configured to issue a readout request to the interface; and a buffer configured to hold the data from the chip. The interface transfers the data in the first cache to the buffer without reading out the data from the cell array if the readout address matches the first address, transfers the data in the second cache to the buffer without reading out the data from the cell array if the readout address matches the second address, and reads out the data from the cell array and transfers the data to the buffer if the readout address does not match either one of the first or second address.

46 Claims, 14 Drawing Sheets

(56) References Cited

FOREIGN PATENT DOCUMENTS

| | | |
|---|---|---|
| JP | 2007-213806 | 8/2007 |
| JP | 2009-15856 | 1/2009 |
| JP | 2009-158015 | 7/2009 |
| JP | 2009-211217 | 9/2009 |

\* cited by examiner

READOUT REQUEST:
OPERATION IN CASE OF HIT (CASE 0)

READOUT REQUEST:
OPERATION IN CASE OF HIT (CASE 1)

MEMORY SYSTEM INCLUDING FIRST AND SECOND CACHES AND CONTROLLING READOUT OF DATA THEREFROM

CROSS-REFERENCE TO RELATED APPLICATIONS

This application is based upon and claims the benefit of priority from the prior Japanese Patent Application No. 2010-282442, filed on Dec. 17, 2010; the entire contents of which are incorporated herein by reference.

FIELD

Embodiments described herein relate generally to a memory system.

BACKGROUND

In a storage system such as a SSD that uses a NAND type flash memory of the related art, pre-fetching of reading out data predicted to be requested from a host from a NAND type flash memory is carried out in advance to hide the waiting time of when reading out data from the NAND type flash memory, and the performance is enhanced with an access pattern such as a sequential read.

DETAILED DESCRIPTION

In general, according to one embodiment, a memory system includes a memory chip including a non-volatile memory cell array and first and second cache regions for temporarily holding data of a predetermined size read out from the memory cell array; a memory interface for managing a first address information history which is a physical address on the memory cell array in which the data held in the first cache region is stored and a second address information history which is a physical address on the memory cell array in which the data held in the second cache region is stored; a controller for issuing a readout request including a readout address that specifies the physical address on the memory cell array to the memory interface; and a buffer memory for temporarily holding the data read out from the memory chip. The memory interface transfers the data held in the first cache region to the buffer memory without reading out the data corresponding to the readout address from the memory cell array if the readout address matches the first address information history, transfers the data held in the second cache region to the buffer memory without reading the data corresponding to the readout address from the memory cell array if the readout address matches the second address information history, and reads out the data corresponding to the readout address from the memory cell array and transfers the same to the buffer memory if the readout address does not match either one of the first or second address information histories.

In the related art, the amount of buffer for recording the data cached to reuse the data or the data pre-fetched to enhance the access performance becomes large, and furthermore, compression of internal band width, complication of buffer management, and the like become serious in addition to the amount of buffer becoming enormous when attempting to correspond to the readout of plurality of continuous data to further enhance the performance. The processing time permitted to manage the pre-fetching becomes very short with higher speed of the host I/F, and hence the process for enhancing the performance may in turn suppress the performance.

Exemplary embodiments of the memory system will be explained below in detail with reference to the accompanying drawings. The present invention is not limited to the following embodiments.

First Embodiment

Figure 1:
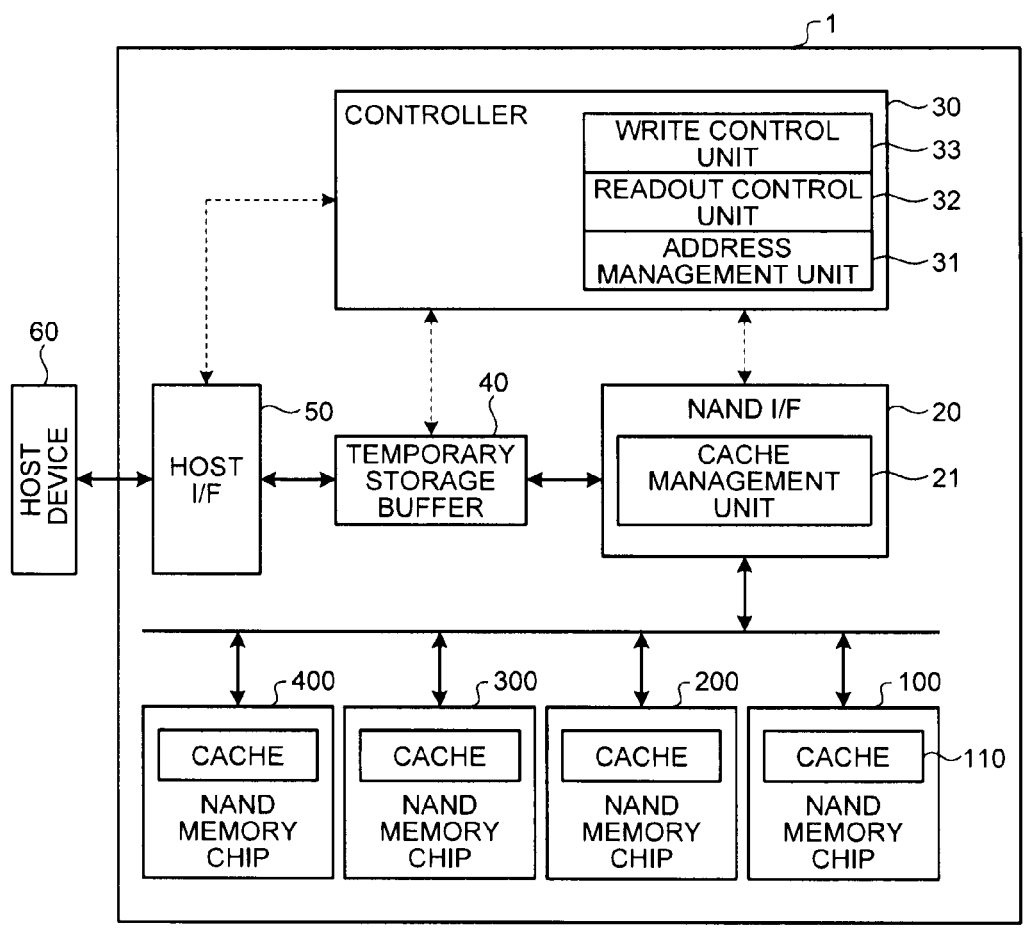
FIG. 1 is a block diagram illustrating a configuration of a memory system according to a first embodiment.

FIG. 1 is a block diagram illustrating a configuration of a memory system 1 according to the present embodiment. An SSD (Solid State Drive) will be described by way of example as an example of the memory system 1, but the application target of the present embodiment is not limited to the SSD. For instance, the present embodiment may be applied to a semiconductor memory for storing data in a non-volatile manner, and an auxiliary storage device such as a memory card mounted with a controller. In FIG. 1, roughly, the data line is indicated with a solid line and the control line is indicated with a broken line.

Each function block in each embodiment can be realized as either one of hardware or software, or as a combination of both. Thus, each function block will be more or less described below from the standpoint of such functions so as to clarify that each function block may be any one of the above. Whether such functions are realized as hardware or realized as software depends on a design restriction imposed on a specific embodiment or the entire system. Those skilled in the art may realize such functions through various methods for every specific embodiment, but such realizations are to be encompassed within the scope of the invention.

The memory system 1 is connected to a host device 60 such as a personal computer with a host interface (host I/F) 50, and functions as an external storage device of the host device 60. The memory system 1 includes the host I/F 50, NAND memory chips 100 to 400, which are non-volatile semiconductor memories, for storing data read/write to/from the host device 60, a controller 30 for executing various types of controls related to the data transfer control of the memory system 1 and the host device 60, a temporary storage buffer 40 (buffer memory) used by the controller 30 to primarily store the transfer data for data transfer and configured by a volatile semiconductor memory such as a DRAM, and an NAND interface (NAND I/F) 20 (memory interface) for executing the data transfer control between the NAND memory chips 100 to 400 and the temporary storage buffer 40.

The controller 30 includes an address management unit 31, and a volatile semiconductor memory (not illustrated) such as a SRAM or an DRAM. The address management unit 31 manages a logical/physical translation table showing a correspondence relationship between an LBA (Logical Block Addressing) serving as a logical address specified by the host device 60 and a physical address or a data storage position on the NAND memory chips 100 to 400 on the volatile semiconductor memory.

The data transmitted from the host device 60 is once stored in the temporary storage buffer 40 through the host I/F 50 based on the control of the controller 30, and then read out from the temporary storage buffer 40 and written to the NAND memory chips 100 to 400 through the NAND I/F 20. The data read out from the NAND memory chips 100 to 400 is once stored in the temporary storage buffer 40 through the NAND I/F 20, and then read out from the temporary storage buffer 40 and transferred to the host device 60 through the host I/F 50.

The NAND memory chips 100 to 400 store user data specified by the host device 60, and store management information managed by the address management unit 31 for backup. The NAND memory chips 100 to 400 include a memory cell array in which a plurality of memory cells is arrayed in a matrix form. Each memory chip 100 to 400 is configured by arraying a plurality of physical blocks, which is a unit of data erase. For instance, in the NAND memory chip 100, the write of data and the readout of data are carried out for every physical page. The physical block is configured by a plurality of physical pages.

The host I/F 50 includes a communication interface of ATA (Advanced Technology Attachment) standard, and controls the communication of the memory system 1 and the host device 60 according to the control of the controller 30. The host I/F 50 receives a command transmitted from the host device 60, and sends the relevant command (write command) to the controller 30 if write of data in which the logical address (LBA) is specified is requested by the relevant command. In this case, the data requested to be written is sent to the temporary storage buffer 40.

The temporary storage buffer 40 is used as a temporary storage unit for data transfer. In other words, it is used to temporarily save the data requested to be written from the host device 60 before being written to the NAND memory chips 100 to 400, and to read out the data requested to be read out from the host device 60 from the NAND memory chips 100 to 400 and temporarily save the same. The NAND I/F 20 executes the data transfer control between the NAND memory chips 100 to 400 and the temporary storage buffer 40.

The controller 30 has a function of interpreting the command received from the host device 60 through the host I/F 50 and controlling the NAND I/F 20 in accordance therewith. The controller 30 further includes a readout control unit 32 and a write control unit 33. The readout control unit 32 interprets the readout request received from the host I/F 50, and issues the NAND control command related to the readout to the NAND I/F 20. The write control unit 33 interprets the write request received from the host I/F 50, and issues the NAND control command related to the write to the NAND I/F 20.

Figure 2:
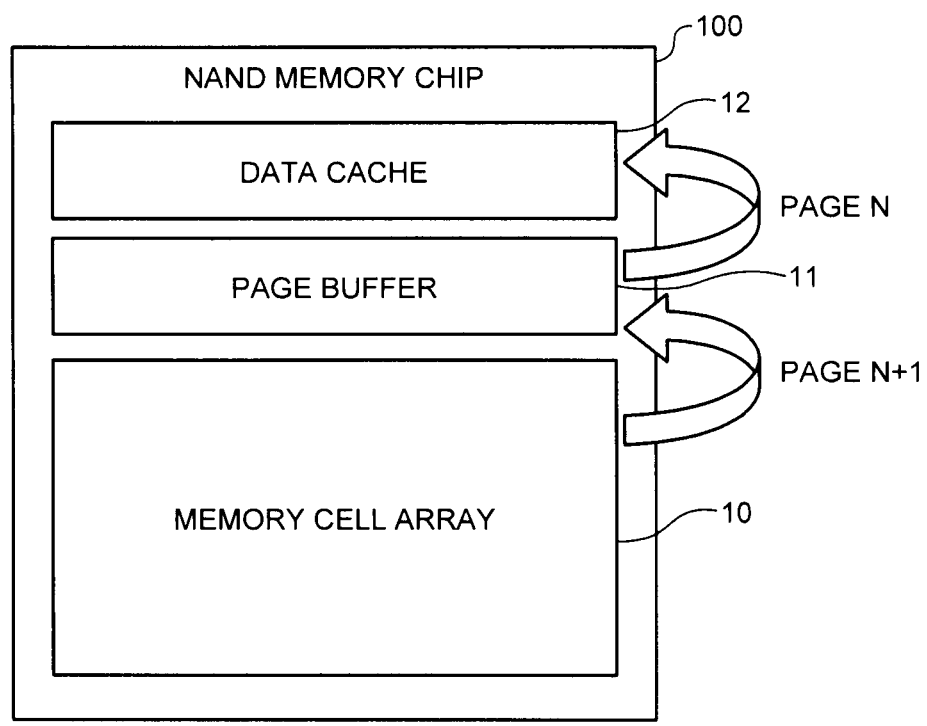
FIG. 2 is a view illustrating one example of a configuration of an NAND memory chip of the first embodiment.

The NAND memory chips 100 to 400 store the data write requested by the host command. The NAND memory chips 100 to 400 are configured by NAND type non-volatile storage elements. The NAND memory chip 100 will be described in FIG. 2 by way of example as an example of the configuration of each NAND memory chip. The NAND memory chip 100 includes a memory cell array 10 with a read and write unit (page), and an erase unit in which a plurality of pages called blocks is collected. The data of one page has a size in which a data section of integral multiples of a sector size and a redundant section used for error correction or the like are added. The NAND memory chip 100 inputs and outputs the data of one or a plurality of sector sizes write/readout requested from the host device 60 in units of pages based on the NAND control command received from the controller 30 through the NAND I/F 20.

The NAND memory chip 100 includes a data cache 12 (second cache region) or a primary buffer for transmitting and receiving the transfer data of a page size with the NAND I/F 20, and a page buffer 11 (first cache region) or a secondary buffer interposed between the data cache 12 and the memory cell array 10. The page buffer 11 and the data cache 12 are collectively indicated as a cache 110 in FIG. 1. The page buffer 11 and the data cache 12 are configured by an SRAM.

At the time of write, the NAND memory chip 100 stores the data transmitted from the NAND I/F 20 in the data cache 12, transfers the stored data to the page buffer 11, and writes the data stored in the page buffer 11 to the memory cell array 10 in units of pages after completion of transfer. At the time of readout, the NAND memory chip 100 reads out the readout requested data from the memory cell array 10 to the page buffer 11 in units of pages, transfers the data from the page buffer 11 to the data cache 12 after the completion of readout, and transfers the data from the data cache 12 to the NAND I/F 20.

The NAND I/F 20 has a function of storing the address information (hereinafter referred to as address information history) indicating to which physical address (page address) the data of a page size currently stored in each page buffer 11 and data cache 12 in the NAND memory chips 100 to 400 corresponds in the memory cell array 10, and updating the address information history according to the write and readout request, to be described later. For instance, the address information history of the page buffer 11 is assumed as a first address information history, and the address information history of the data cache 12 is assumed as a second address information history.

In the present embodiment, a cache management unit 21 arranged in the NAND I/F 20 manages the physical address of the data of a page size currently stored in the page buffer 11 and the data cache 12. The NAND I/F 20 is thus able to carry out the operation at the time of readout described below.

The controller 30 receives the readout request from the host device 60 through the host I/F 50. The logical address (LBA) is specified as the readout address in the readout request. The readout control unit 32 of the controller 30 interprets the readout request received from the host I/F 50, and issues the NAND control command related to the readout to the NAND I/F 20. Specifically, the physical address corresponding to the logical address (LBA) specified in the readout request is obtained using the logical/physical translation table managed by the address management unit 31, and the relevant physical address (hereinafter referred to as readout address) is issued to the NAND I/F 20 as a NAND control command with the readout request.

The operation of the memory system 1 from when the NAND control command including the readout request and the readout address is issued from the readout control unit 32 of the controller 30 to the NAND I/F 20, particularly, the operation of the NAND I/F 20 will be hereinafter described using the flowcharts of FIG. 3 to FIG. 6.

Figure 3:
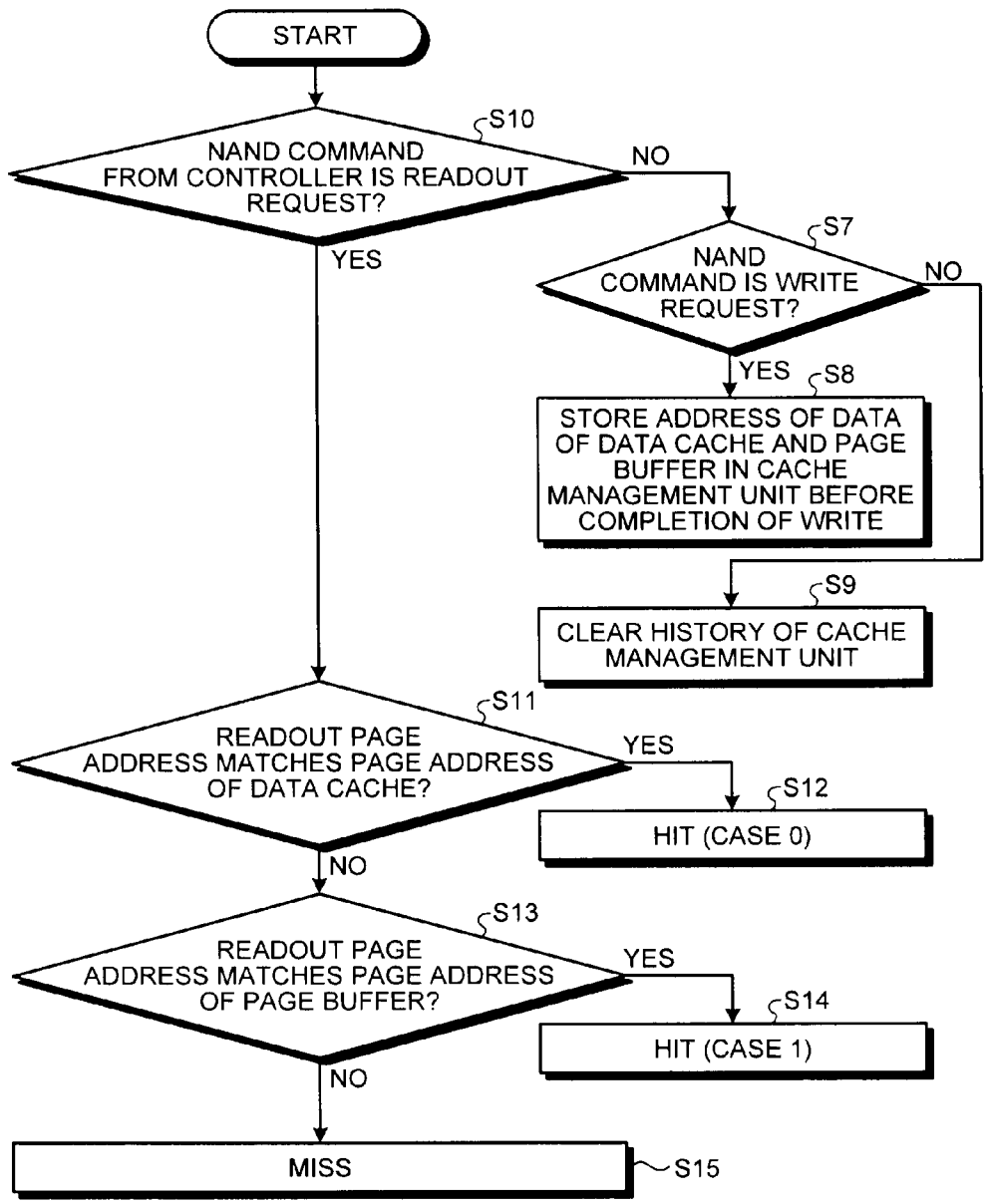
FIG. 3 is a flowchart illustrating a state of address determination at the time of readout of the first embodiment.

First, the flowchart of FIG. 3 will be described. In FIG. 3, a case in which a control that takes into consideration both the page buffer 11 and the data cache 12 is carried out using the cache read function of the NAND memory chip 100 is assumed.

In the present embodiment, the cache read means the operation of precedingly reading out (pre-fetching) the data of continuing page address or specified page address from the memory cell array 10 to the page buffer 12 while carrying out the data output from the data cache 12 to the outside using the page buffer 11 and the data cache 12, where the cache read command indicates a command instructing such operation. In the present embodiment, the operation of pre-fetching the data of the succeeding page address to the page buffer 11 is referred to as the sequential cache read, and the operation of pre-fetching the data of the specified page address to the page buffer 11 is referred to as the random cache read.

The NAND memory chip 100 can execute at least one of either the sequential cache read or the random cache read. When using the cache read command, an end command (e.g., "3Fh") is generally input at the time of the address input of the readout target final page to cancel the readout of the succeeding page to the page buffer 11. In the present embodiment, however, the NAND I/F 20 does not input such end command, but always precedingly reads out the data of the succeeding page address or the specified page address to the page buffer 11 and manages the physical address (page address) thereof to use the page buffer 11 as the buffer for pre-fetching.

The cache management unit 21 determines whether or not the NAND control command issued to the NAND I/F 20 is a readout request (FIG. 3, step S10). If not the readout request (step S10: No), the cache management unit 21 determines whether or not the NAND control command issued to the NAND I/F 20 is a write request (step S7).

If the NAND control command issued to the NAND I/F 20 is the write request (step S7: Yes), the cache management unit 21 stores the physical address (page address) on the memory cell array 10 of the data held in the page buffer 11 and the data cache 12 to be written to the memory cell array 10 as first and second address information histories, respectively, until the execution of the write command is completed (step S8).

The data held for write in the page buffer 11 and the data cache 12 thus can be reused as cache when the readout address is a hit to the address information history at the time of the readout request described below. If determined that the NAND control command is also not the write request in step S7 (step S7: No), the cache management unit 21 executes the relevant command and clears the address information history (step S9).

If determined as the readout request in the determination of step S10 (step S10: Yes), the NAND control command includes the readout request and the readout address. The cache management unit 21 then proceeds to step S11 to reference the address information history. Here, the readout address will be described as a physical address or the data storage position on the memory cell array 10 of the NAND memory chip 100. More specifically, the readout address indicates the page position to read out and the column position in the relevant page.

In step S11, the cache management unit 21 determines whether or not the address (hereinafter referred to as readout page address) of the page including the readout address matches the physical address (page address) of the data stored in the data cache 12 stored as the address information history. If the readout page address matches the page address of the data stored in the data cache 12 (step S11: Yes), the process proceeds to "hit (case 0)" (step S12).

If the readout page address does not match the page address of the data stored in the data cache 12 (step S11: No), the cache management unit 21 determines whether or not the readout page address matches the physical address (page address) of the data stored in the page buffer 11 stored as the address information history (step S13).

If the readout page address matches the page address of the data stored in the page buffer 11 (step S13: Yes), the process proceeds to "hit (case 1)" (step S14). In other cases (step S13: No), the process proceeds to "miss" (step S15).

Figure 4:
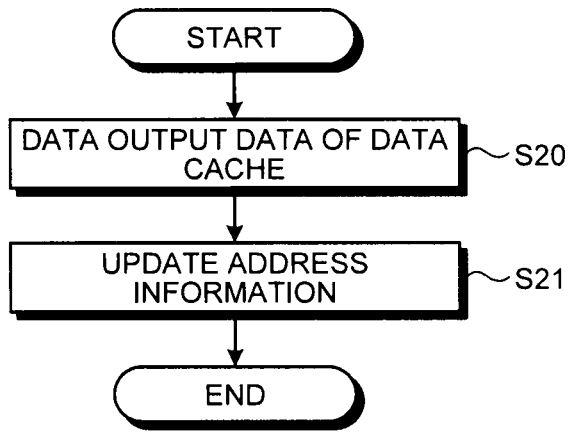
FIG. 4 is a flowchart illustrating the operation of the memory system of when the address determination is a hit.

In the case of "hit (case 0)" (step S12 of FIG. 3), the NAND I/F 20 issues a read command requesting the readout from the data cache 12 with respect to the NAND memory chip 100. The operation of the memory system 1 of when there is a hit to the data cached in the data cache 12 is illustrated in the flowchart of FIG. 4.

The NAND I/F 20 issues the command (e.g., "05h"-column address-"E0h") for outputting the data of a range corresponding to the readout address of the data of the page size held in the data cache 12 from the data cache 12 with respect to the NAND memory chip 100. Upon receiving the input of the /RE clock, the NAND memory chip 100 outputs the data of the range corresponding to the specified column address from the data cache 12. The NAND I/F 20 transfers the data output from the NAND memory chip 100 to the temporary storage buffer 40 (step S20). When outputting the data from the head of the page address, the /RE clock may be toggled without command input.

The cache management unit 21 then updates the address information history (step S21). The address information history of the data cache 12 is invalidated here. Alternatively, if flag information indicating whether or not the data of the relevant address is output is held with the address information history, consideration is made in adding the flag information indicating that the data of the data cache 12 is already data output.

As there is no change in the content of the data cache 12 and the page buffer 11, the cache management unit 21 may choose not to perform anything on the address information history. In this case, a new command to the NAND memory chip is not issued since the data of the continuing page address or the specified page address is already pre-fetched to the page buffer 11.

In the case of "hit (case 1)" (step S14 of FIG. 3), the NAND I/F 20 issues a read command requesting the readout from the page buffer 11 with respect to the NAND memory chip 100.

Figure 5:
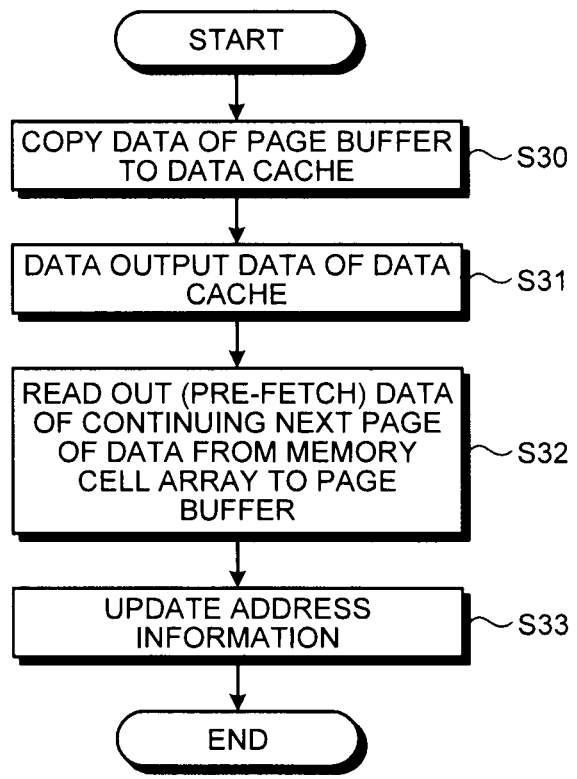
FIG. 5 is another flowchart illustrating the operation of the memory system of when the address determination is a hit.

The operation of the memory system 1 of when there is a hit to the data cached in the page buffer 11 is illustrated in the flowchart of FIG. 5. Furthermore, the changes in the state of I/O signal of the NAND memory chip 100, the state of Ry/By signal, and the internal operation state in this case are illustrated in FIG. 6.

Figure 6:
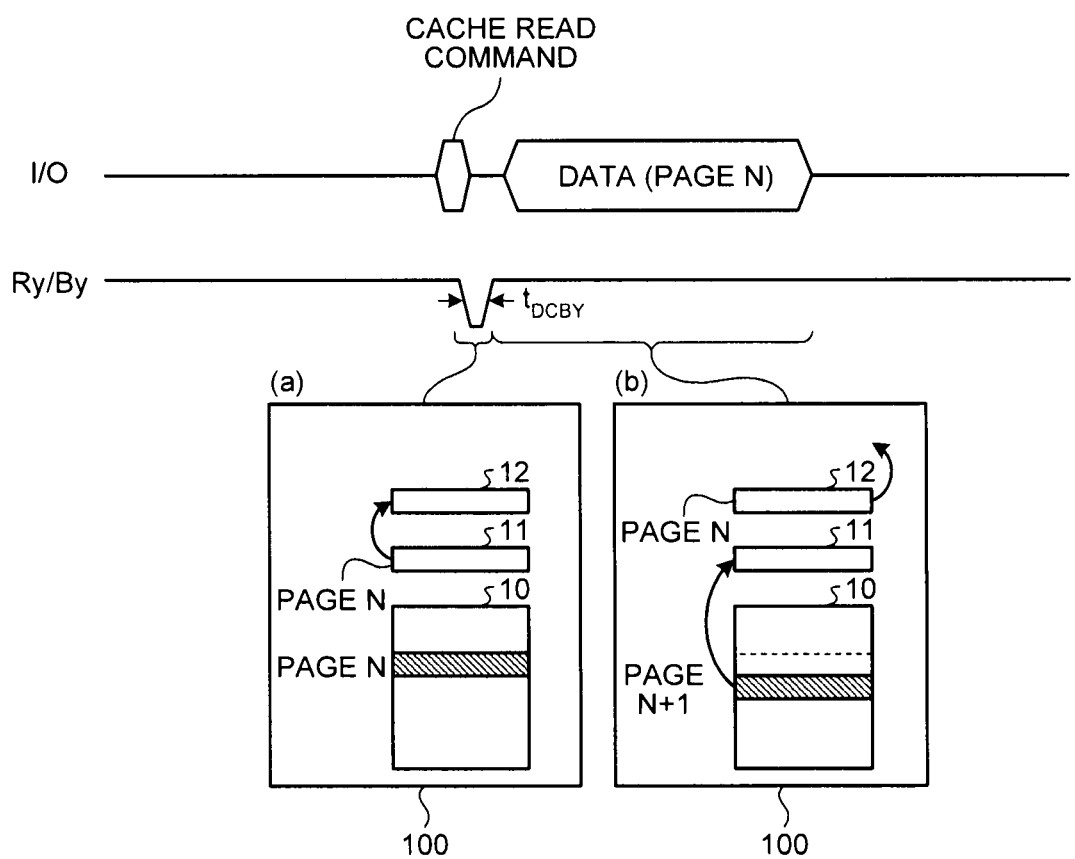
FIG. 6 is a view illustrating changes in the state of I/O signal, the state of Ry/By signal, and the operation state of the NAND memory chip 100 of when the address determination is a hit.

As illustrated in FIG. 6, the NAND I/F 20 inputs a cache read command to the NAND memory chip 100 for data transfer from the page buffer 11 to the data cache 12, data output from the data cache 12, and pre-fetching of the data of the succeeding page address or the specified page address to the page buffer 11. A sequential cache read command (e.g., "31h") is input when pre-fetching the data corresponding to the succeeding continuing page address, and a random cache read command (e.g., "00h"-page address-"31h") is input when specifying the page address to pre-fetch.

Upon receiving the cache read command, the NAND memory chip 100 transfers the data of the page buffer 11 to the data cache 12 (FIG. 5, step S30) (FIG. 6(*a*)). Indicating the latency during such time as tDCBY, the NAND memory chip 100 assumes the Ry/By signal as the By state. tDCBY will be described later.

When the data transfer (step S30) from the page buffer 11 to the data cache 12 is completed, the Ry/By signal becomes the Ry state. Thereafter, the NAND I/F 20 issues the command (e.g., "05h"-column address-"E0h") for outputting the data of a range corresponding to the readout address of the data of the page size held in the data cache 12 from the data cache 12 with respect to the NAND memory chip 100. Upon receiving the input of the /RE clock, the NAND memory chip 100 outputs the data of the range corresponding to the specified column address from the data cache 12. The NAND I/F 20 transfers the data output from the NAND memory chip 100 to the temporary storage buffer 40 (step S31) (FIG. 6(*b*)). When outputting the data from the head of the page address, the /RE clock may be toggled without command input.

In parallel with the data output from the data cache 12, the NAND memory chip 100 reads out (pre-fetches) the data of the succeeding page address from the memory cell array 10 to the page buffer 11 in the case of the sequential cache read, and reads out the data of the specified page address from the memory cell array 10 to the page buffer 11 in the case of the random cache read (step S32) (FIG. 6(*b*)).

Lastly, the cache management unit 21 updates the address information history to the physical address (page address) corresponding to the data newly held in the data cache 12 and the page buffer 11 (step S33).

If the cache read command issued by the NAND I/F 20 is the sequential cache read, the page addresses of the data held in the data cache 12 and the page buffer 11, which are two buffers inside the NAND memory chip 100, are continuous. Therefore, if there is a hit to the buffer storing the data (page N) of larger page address of the data held in the two buffers inside the NAND memory chip 100, the data (page N+1) of the succeeding page address is automatically pre-fetched, so that effects similar to the present embodiment can be achieved.

If the NAND I/F 20 issues the random cache read command, the readout control unit 32 of the controller 30 has an address predicting function of predicting the address to read out next, the NAND I/F 20 has a function of receiving a plurality of requests, and the NAND memory chip 100 needs to be able to interpret the random cache read command. In this case, the following operation is carried out.

In other words, the controller 30 issues the NAND control command related to the readout with respect to the NAND I/F 20 and also predicts and issues the address of the data to read out next, and the NAND I/F 20 executes the requested data transfer, issues the specified address to the NAND memory chip 100 using the random cache read command, and prepares (pre-fetches) the data predicted to be read out next in the page buffer 11.

The NAND I/F 20 may carry out the switching of the operation based on whether or not the address to read out next is received from the host device 60. Specifically, if the address to read out next is received, the NAND I/F 20 issues the specified address to the NAND memory chip 100 using the random cache read command and prepares the data predicted to be read out next in the page buffer 11. If the address to read out next is not received, the NAND I/F 20 uses the sequential cache read command to prepare the data of the succeeding page address in the page buffer 11.

Figure 7:
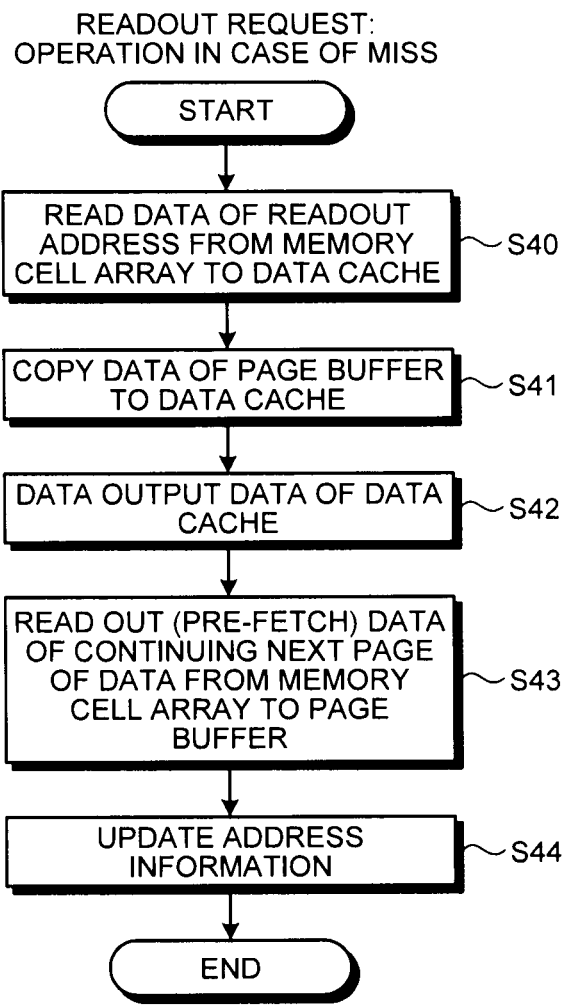
FIG. 7 is a flowchart illustrating the operation of the memory system of when the address determination is a miss.

The operation of the memory system 1 in the case of "miss" (step S15 of FIG. 3) is illustrated in the flowchart of FIG. 7. Furthermore, the changes in the state of I/O signal of the NAND memory chip 100, the state of Ry/By signal, and the internal operation state in this case are illustrated in FIG. 8.

The NAND I/F 20 transmits a read command ("00h") notifying to start the readout operation, a page address of the readout target, and a read start command ("30h") notifying to start the internal readout operation to the NAND memory chip 100. The readout command, the address, and the readout start command configure a normal read command as a whole (e.g., "00h"-page address-"30h").

Figure 8:
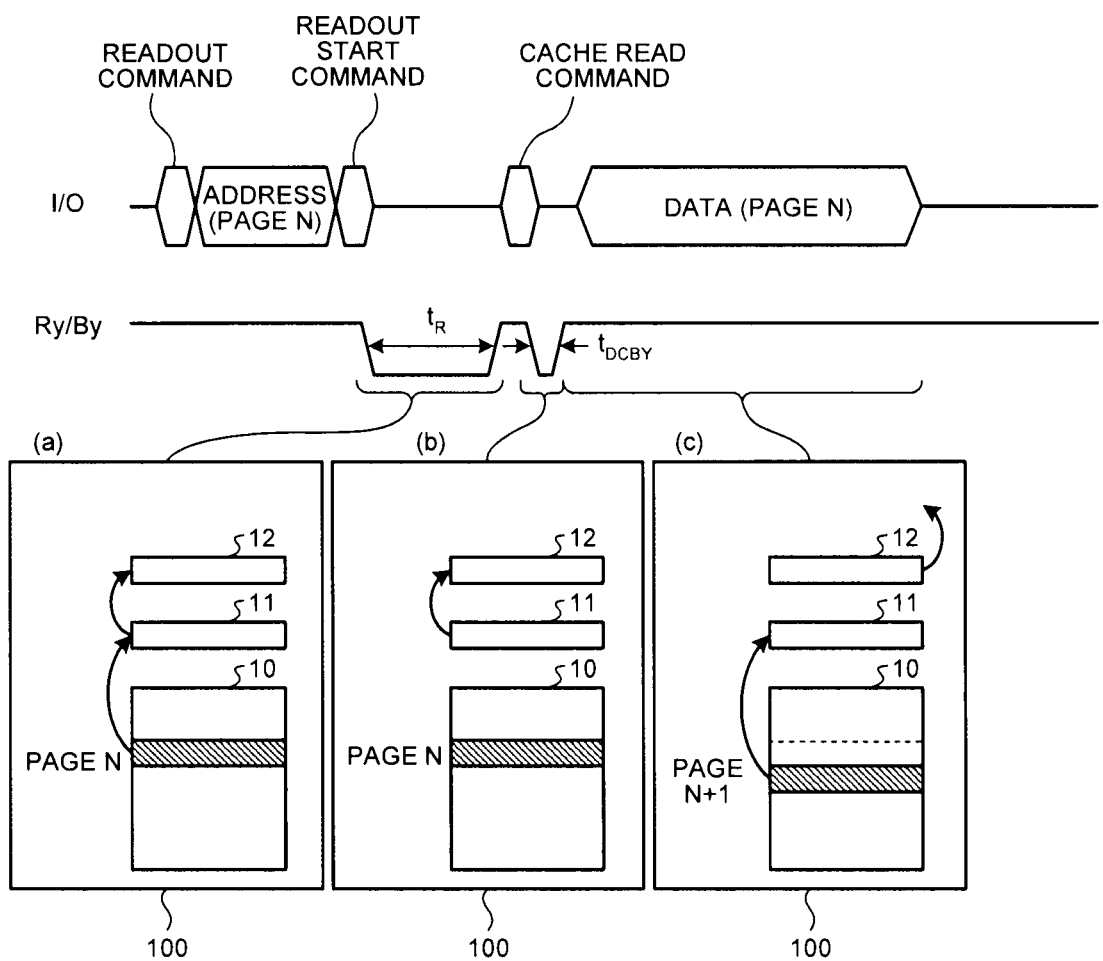
FIG. 8 is a view illustrating changes in the state of I/O signal, the state of Ry/By signal, and the operation state of the NAND memory chip 100 of when the address determination is a miss.

As illustrated in FIG. 8, the NAND memory chip 100 changes the Ry/By signal from Ry to By after receiving the read start command. The data is read out from the page N of the memory cell array 10, and the read data is stored in the page buffer 11. The NAND memory chip 100 transfers the data stored in the page buffer 11 to the data cache 12 (step S40) (FIG. 8(*a*)). The NAND memory chip 100 changes the Ry/By signal from By state to Ry state after storing the data read out from the page N in the data cache 12. The time (latency) the Ry/By signal is in the By state is tR.

After the Ry/By signal returns to Ry, the NAND I/F 20 transmits the cache read command to the NAND memory chip 100. When receiving the cache read command, the NAND memory chip 100 again transfers the data related to the page N stored in the page buffer 11 to the data cache 12, as illustrated in FIG. 8(*b*) (step S41). Meanwhile, the NAND memory chip 100 assumes the Ry/By signal as the By state during tDCBY. The process of transferring the data from the page buffer 11 to the data cache 12 is the data transfer between registers, and hence is executed in a time significantly shorter than the internal read involving access to the memory cell array 10. In other words, tDCBY is significantly smaller than tR.

The Ry/By signal is in the Ry state when the data transfer from the page buffer 11 to the data cache 12 is completed (step S41). Thereafter, the NAND I/F 20 issues a command (e.g., "05h"-column address-"E0h") for outputting the data of a range corresponding to the readout address of the data of the page size held in the data cache 12 from the data cache 12 with respect to the NAND memory chip 100. Upon receiving the input of the /RE clock, the NAND memory chip 100 outputs the data of the range corresponding to the specified column address from the data cache 12. The NAND I/F 20 transfers the data output from the NAND memory chip 100 to the temporary storage buffer 40 (step S42) (FIG. 8(*c*)). When outputting the data from the head of the page address, the /RE clock may be toggled without command input.

In parallel with the data output from the data cache 12, the NAND memory chip 100 reads out (pre-fetches) the data of the succeeding continuing page address from the memory cell array 10 to the page buffer 11 in the case of the sequential cache read, and reads out the data of the specified page address from the memory cell array 10 to the page buffer 11 in the case of the random cache read (step S43) (FIG. 8(c)).

Lastly, the cache management unit 21 updates the address information history to the physical address (page address) corresponding to the data newly held in the data cache 12 and the page buffer 11 (step S44).

The readout address has been described limited to being the physical address on the NAND memory chip 100 for the sake of simplification, but operations similar to the above may be executed on the NAND memory chips 200 to 400 if the readout address is other than the NAND memory chip 100. In other words, if the data cache and the page buffer are arranged in each of the plurality of NAND memory chips 100 to 400 illustrated in FIG. 1, the readout control involving pre-fetching can be carried out similar to the above by having the cache management unit 21 manage all the physical addresses of the data held therein.

When the data of plural pages in which the physical address is continued is the readout target from the host device 60, the latency tR related to the internal read is generated every time the normal read is executed if the normal read command (e.g., "00h"-page address-"30h") is executed for every page address.

On the other hand, if the cache read command used in the present embodiment is executed, the latency tR related to the internal read may be generated at the time of readout of the data of the first page address but the transfer of the data of the next page address can be started without generating a large latency as with tR since the data of the next page address is read ahead (pre-fetched) to the page buffer 11 by the time the transfer of the data for one page is completed.

In other words, if the next readout address is a hit to the data pre-fetched to the page buffer 11, the latency time related to the internal read can be hidden by using the cache read and the data transfer can be efficiently carried out between the host device 60 and the memory system 11 as a result.

The cache read includes a cache busy time (tDCBY) for reading out the succeeding page in the cache memory, during which time the next read cannot be executed and thus overhead occurs and an interval is generated between reads. In other words, the response time is shorter in the normal read with regards to a single command. In order to exhibit the difference in characteristics, the cache read can be used for the sequential read request and the normal read can be used for the random read request thus enhancing the performance.

The determination in the use of the cache read and the normal read may be made by the readout control unit 32 of the controller 30. For instance, the readout control unit 32 may have a function or presuming whether the random read or the sequential read based on the data size of the readout request from the host device 60, whether or not the readout request is continuous in logical address (LBA), the number of queuing of the command issued from the host device 60, and the like, and assuming the same as the criterion for usage. In this case, the NAND I/F 20 needs to have a function of canceling the pre-fetch operation (switching the operation to normal read) according to the request from the controller 30.

For instance, if the data size related to the readout request from the host device 60 is smaller than or equal to a predetermined threshold value, the readout control unit 32 issues the NAND control command including a pre-fetch prohibit read request to the NAND I/F 20. That is, the cache read is not used assuming it is the random read request when the data size is small. In this case, the NAND I/F 20 issues the normal read command and executes the data readout with respect to the NAND memory chip 100.

Furthermore, if the readout request from the host device 60 is not continuous in logical address (LBA), that is, if the readout control unit 32 determines as not the sequential read request, the readout control unit 32 issues the NAND control command including the pre-fetch prohibit read request to the NAND I/F 20. In this case, the NAND I/F 20 issues the normal read command and executes the data readout with respect to the NAND memory chip 100.

If the number of queuing of the command issued from the host device 60 is greater than or equal to the threshold value, the readout control unit 32 assumes it is the random read request, and issues the NAND control command including a pre-fetch prohibit read request to the NAND I/F 20. In this case, the NAND I/F 20 issues the normal read command and executes the data readout with respect to the NAND memory chip 100.

On the contrary, if the readout control unit 32 determines that the readout request from the host device 60 is the sequential read request, the NAND control command including only the readout request requested from the host device 60 is notified to the NAND I/F 20 anticipating the function of the NAND I/F 20 as described in the present embodiment.

For instance, if the data size related to the readout request from the host device 60 is greater than the predetermined threshold value, the readout control unit 32 issues the NAND control command including only the readout request of the address requested from the host device 60 to the NAND I/F 20 assuming it is the sequential read request. In this case, the NAND I/F 20 issues the cache read command and executes the data readout with respect to the NAND memory chip 100.

Furthermore, if the readout request from the host device 60 is continuous in logical address (LBA), the readout control unit 32 issues the NAND control command including only the readout request of the address requested from the host device 60 to the NAND I/F 20 assuming it is the sequential read request. In this case, the NAND I/F 20 issues the cache read command and executes the data readout with respect to the NAND memory chip 100.

If the number of queuing of the command issued from the host device 60 is smaller than the threshold value, the readout control unit 32 assumes it is the sequential read request, and issues the NAND control command including only the readout request of the address requested from the host device 60 to the NAND I/F 20. In this case, the NAND I/F 20 issues the cache read command and executes the data readout with respect to the NAND memory chip 100.

As described above, the readout is executed in view of the physical address on the memory cell array 10 of the data held in the data cache 12 and the page buffer 11 at the time of data readout in the present embodiment.

In other words, since the page address (address information history) of the data cached in the data cache 12 and the page buffer 11 is stored in the cache management unit 21 expecting to be reused at the time of readout, the data already stored from the memory cell array 10 to the data cache 12 or the page buffer 11 can be read out at high speed without access to the memory cell array 10.

Since the page buffer 11 is used as the pre-fetching buffer using the cache read command, if the next readout address corresponds to the page address of the data stored in the page buffer 11, it can be readout at high speed without access to the memory cell array 10.

In other words, through the use of the existing data cache 12 and the page buffer 11 in the NAND memory chip instead of the temporary storage buffer 40 such as the DRAM, the memory system in which the cache and the pre-fetch more effectively function can be provided without complex control. Furthermore, the buffer for cache or pre-fetch does not necessarily need to be arranged exterior to the memory chip, which contributes to reduction in area and reduction in cost of the memory system 1.

Second Embodiment

In the present embodiment, the operation of the memory system 1 of when the NAND I/F 20 is explicitly instructed to perform the execution of pre-fetching from the higher order module such as the controller 30 will be described. The configuration of the memory system 1 of the present embodiment is similar to FIG. 1 and FIG. 2.

The operation of the memory system 1 from when the NAND control command including the pre-fetch request and the physical address (hereinafter referred to as pre-fetch address) in which the pre-fetch is requested is issued from the controller 30 (higher order module) to the NAND I/F 20 will be described using the flowcharts of FIG. 9 to FIG. 11.

Figure 9:
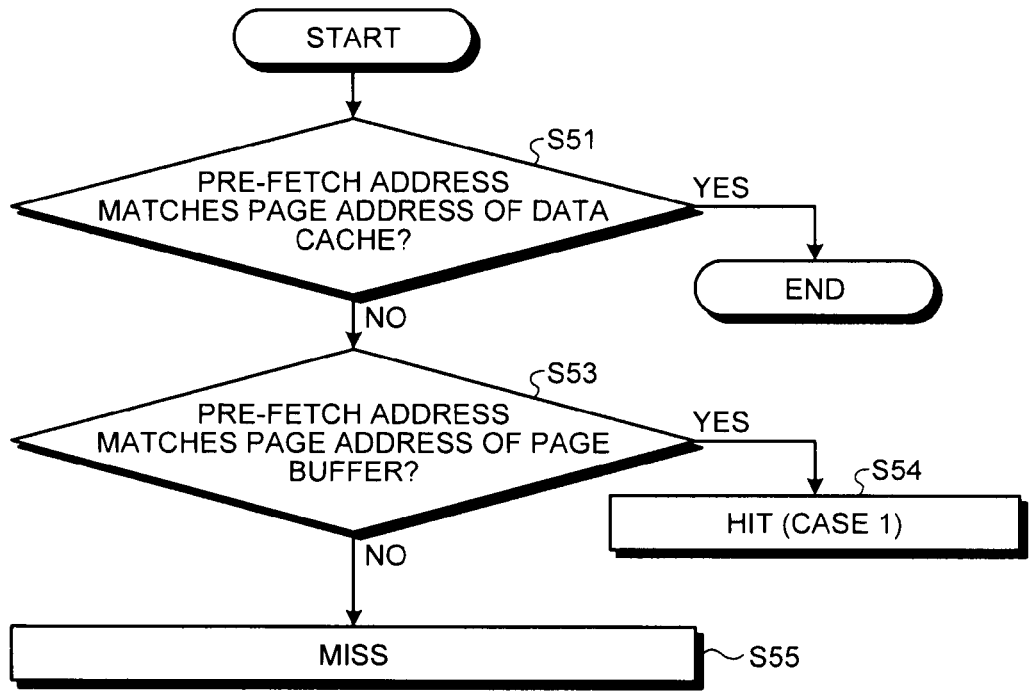
FIG. 9 is a flowchart illustrating a state of address determination at the time of readout of a second embodiment.

First, whether or not the pre-fetch address matches the physical address (page address) of the data stored in the data cache 12 stored as the address information history by the cache management unit 21 is determined in step S51 in the flowchart of FIG. 9. If the pre-fetch address matches the page address of the data stored in the data cache 12 (step S51: Yes), the process is terminated without performing any processing. Thereafter, when the readout request arrives and the readout address matches the page address of the data stored in the data cache 12, it becomes a "hit (case 0)" of step S12 of FIG. 3 of the first embodiment and thus is suitable.

If the pre-fetch address does not match the page address of the data stored in the data cache 12 (step S51: No), the cache management unit 21 determines whether or not the pre-fetch address matches the physical address (page address) of the data stored in the page buffer 11 stored as the address information history (step S53).

If the pre-fetch address matches the page address of the data stored in the page buffer 11 (step S53: Yes), the process proceeds to "hit (case 1)" (step S54). In other cases (step S53: No), the process proceeds to "miss" (step S55).

Figure 10:
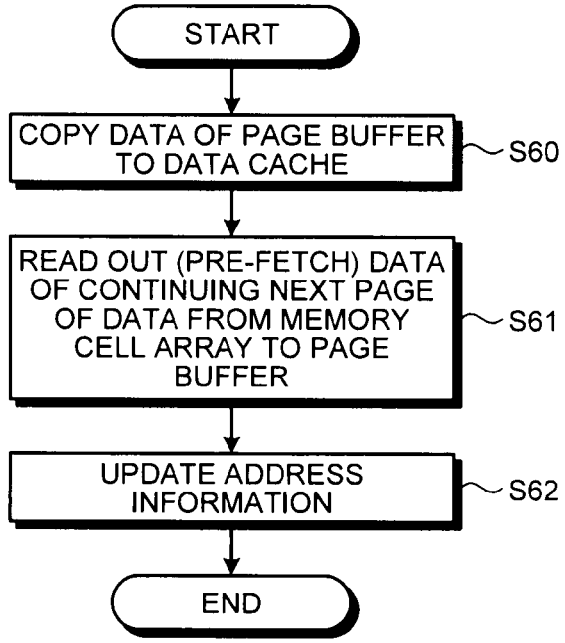
FIG. 10 is a flowchart illustrating the operation of the memory system of when the address determination is a hit.

The operation of the memory system 1 in the case of "hit (case 1)" (step S54 of FIG. 9), that is, when a command requesting for pre-fetch with respect to the data stored in the page buffer 11 is issued from the controller 30 to the NAND I/F 20 is illustrated in the flowchart of FIG. 10.

The NAND I/F 20 inputs the cache read command to the NAND memory chip 100. The sequential cache read command (e.g., "31h") is input when pre-fetching the data corresponding to the succeeding page address, and the random cache read command (e.g., "00h"-page address-"31h") is input when specifying the page address to pre-fetch.

Upon receiving the cache read command, the NAND memory chip 100 transfers the data of the page buffer 11 to the data cache 12 (step S60). The Ry/By signal is in the Ry state when the data transfer from the page buffer 11 to the data cache 12 is completed, where the data stored in the data cache 12 is not output to outside since the data requested to be pre-fetched merely needs to be prepared in the data cache 12.

The NAND memory chip 100 pre-fetches the data of the succeeding page address from the memory cell array 10 to the page buffer 11 in the case of the sequential cache read, and pre-fetches the data of the specified page address from the memory cell array 10 to the page buffer 11 in the case of the random cache read (step S61).

Lastly, the cache management unit 21 updates the address information history to the physical address (page address) corresponding to the data newly held in the data cache 12 and the page buffer 11 (step S62). Therefore, the data corresponding to the explicitly requested pre-fetch address can be prepared (pre-fetched) in the data cache 12.

Figure 11:
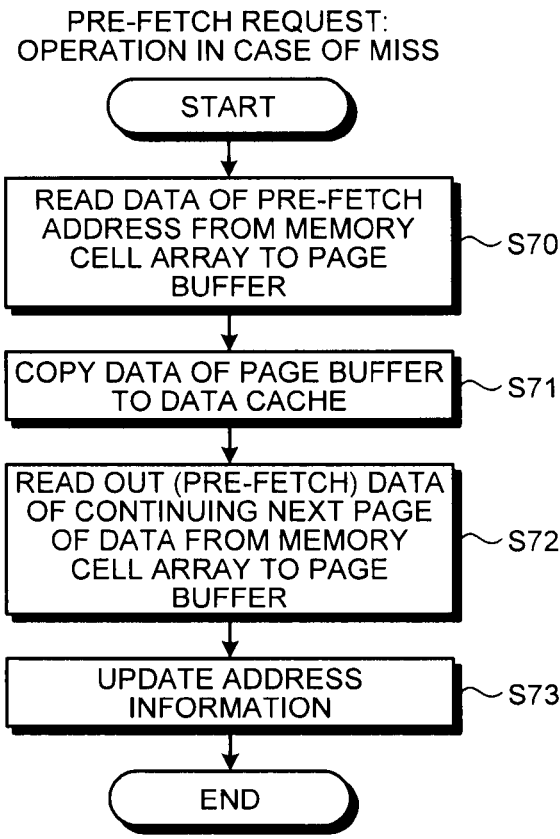
FIG. 11 is a flowchart illustrating the operation of the memory system of when the address determination is a miss.

The operation of the memory system 1 in the case of "miss" (step S55 of FIG. 9) is illustrated in the flowchart of FIG. 11.

The NAND I/F 20 transmits the read command ("00h") notifying to start the readout operation, a pre-fetch address, and a read start command ("30h") notifying to start the internal readout operation to the NAND memory chip 100. These configure the normal read command, as described above.

After receiving the read start command, the NAND memory chip 100 changes the Ry/By signal from Ry to By. The data is then read out from the position corresponding to the pre-fetch address of the memory cell array 10, and the read data is stored in the page buffer 11 (step S70). The NAND memory chip 100 transfers the data stored in the page buffer 11 to the data cache 12 (step S71). The NAND memory chip 100 changes the Ry/By signal from By state to Ry state after storing the data read out from the page N in the data cache 12.

After the Ry/By signal returns to Ry, the NAND I/F 20 transmits the cache read command to the NAND memory chip 100. When receiving the cache read command, the NAND memory chip 100 again transfers the data related to the pre-fetch address stored in the page buffer 11 to the data cache 12 (step S71). Meanwhile, the NAND memory chip 100 assumes the Ry/By signal as the By state during tDCBY.

The Ry/By signal is in the Ry state when the data transfer from the page buffer 11 to the data cache 12 is completed (step S71), where the data stored in the data cache 12 is not output to outside since the data requested to be pre-fetched merely needs to be prepared in the data cache 12.

The NAND memory chip 100 pre-fetches the data of the succeeding continuing page address from the memory cell array 10 to the page buffer 11 in the case of the sequential cache read, and pre-fetches the data of the specified page address from the memory cell array 10 to the page buffer 11 in the case of the random cache read (step S72).

Lastly, the cache management unit 21 updates the address information history to the physical address (page address) corresponding to the data newly held in the data cache 12 and the page buffer 11 (step S73). Therefore, the data corresponding to the explicitly requested pre-fetch address can be prepared (pre-fetched) in the data cache 12.

The data specified with the pre-fetch address can be stored in the data cache 12 when the NAND I/F 20 is explicitly instructed to execute pre-fetching from the higher order module. Thus, if there is a readout request of a range included in the pre-fetch address in the subsequent readout, the data stored in the data cache 12 can be read out at high speed without access to the memory cell array 10.

Third Embodiment

Figure 12:
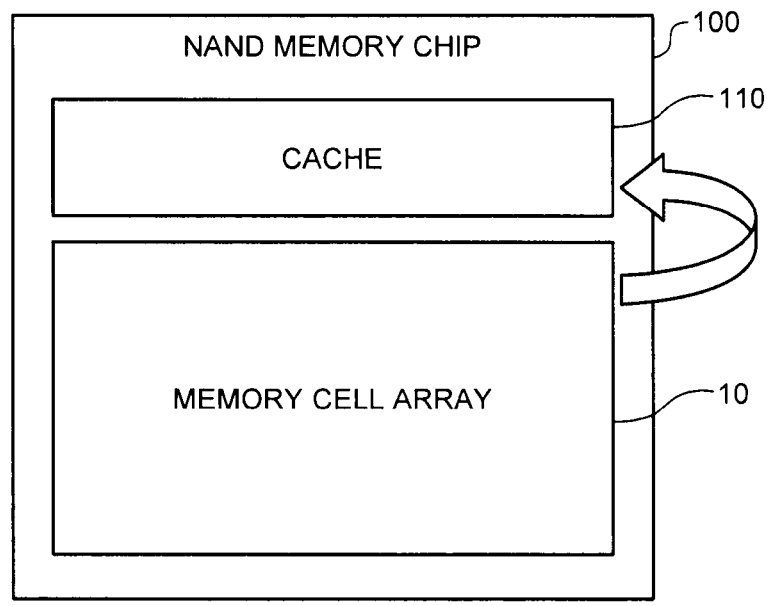
FIG. 12 is a view illustrating one example of a configuration of an NAND memory chip of a third embodiment.

The configuration of the memory system 1 of the present embodiment is similar to FIG. 1. In the present embodiment, the cache 110 of FIG. 1 is not divided into two, the data cache 12 and the page buffer 11, as in FIG. 2, and the cache 110 functions as the data cache of one buffer, as illustrated in FIG. 12. The NAND memory chip itself includes both the data cache 12 and the page buffer 11, and is recognized similar to the present embodiment even for a case in which the control that takes only the data cache 12 into consideration is carried out without using the cache read function of the NAND memory chip 100.

The operation of the memory system 1 from when the NAND command including the readout request and the readout address is issued from the readout control unit 32 of the controller 30 to the NAND I/F 20 will be hereinafter described using the flowcharts of FIG. 13 to FIG. 15.

In the present embodiment, the cache management unit 21 of the NAND I/F 20 manages the physical address (page address) of the data read out to the cache 110. The NAND I/F 20 then can carry out the operation at the time of readout described below.

Figure 13:
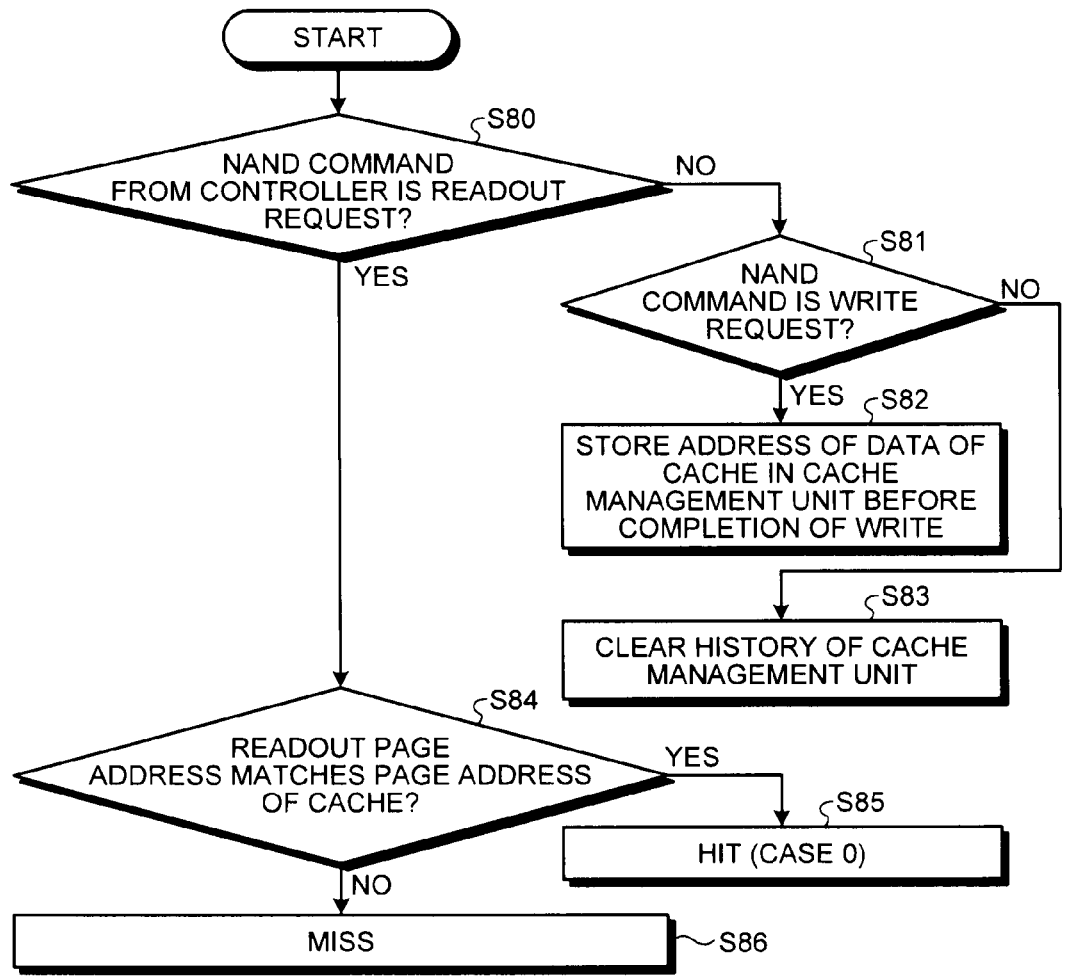
FIG. 13 is a flowchart illustrating a state of address determination at the time of readout of the third embodiment.

First, in the flowchart of FIG. 13, the cache management unit 21 determines whether or not the NAND control command issued to the NAND I/F 20 is the readout request (FIG. 13, step S80). If the command is not the readout request (step S80: No), the cache management unit 21 determines whether or not the NAND control command issued to the NAND I/F 20 is a write request (step S81).

If the NAND control command issued to the NAND I/F 20 is the write request (step S81: Yes), the cache management unit 21 stores the physical address (page address) on the memory cell array 10 of the data held in the cache 110 to be written to the memory cell array 10 as the address information history until the execution of the write command is completed (step S82).

The data held for write in the cache 110 thus can be reused when the readout address is a hit to the address information history at the time of the readout request described below. If determined that the NAND control command is also not the write request in step S81 (step S81: No), the cache management unit 21 executes the relevant command and clears the address information history (step S83).

If determined as the readout request in the determination of step S80 (step S80: Yes), the NAND control command includes the readout request and the readout address. The cache management unit 21 then proceeds to step S84 to reference the address information history. Here, the readout address will be described as a physical address or the data storage position on the memory cell array 10 of the NAND memory chip 100. More specifically, the readout address indicates the page position to read out and the column position in the relevant page.

In step S84, the cache management unit 21 determines whether or not the readout page address matches the physical address (page address) of the data stored in the cache 110 stored as the address information history. If the readout page address matches the page address of the data stored in the cache 110 (step S84: Yes), the process proceeds to "hit (case 0)" (step S85). In other cases (step S84: No), the process proceeds to "miss" (step S86).

Figure 14:
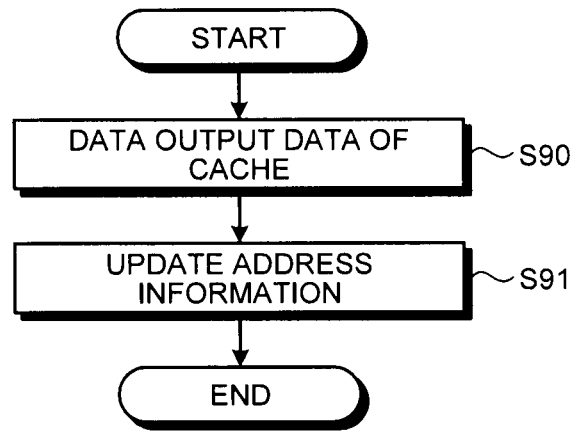
FIG. 14 is a flowchart illustrating the operation of the memory system of when the address determination is a hit.

The operation of the memory system 1 in the case of "hit (case 0)" (step S85 of FIG. 13, that is, when the read command requesting for readout from the cache 110 is issued from the NAND I/F 20 to the NAND memory chip 100 is illustrated in the flowchart of FIG. 14. In the present embodiment, the time at the time of readout can be saved by reusing the data already read out to the cache 110.

The NAND I/F 20 issues the command (e.g., "05h"-column address-"E0h") for outputting the data of a range corresponding to the readout address of the data of the page size held in the cache 110 from the cache 110 with respect to the NAND memory chip 100. Upon receiving the input of the /RE clock, the NAND memory chip 100 outputs the data of the range corresponding to the specified column address from the cache 110. The NAND I/F 20 transfers the data output from the NAND memory chip 100 to the temporary storage buffer 40 (step S90). When outputting the data from the head of the page address, the /RE clock may be toggled without command input.

The cache management unit 21 then updates the address information history (step S91). The address information history of the cache 110 is invalidated here. Alternatively, if flag information indicating whether or not the data of the relevant address is output is held with the address information history, consideration is made in adding the flag information indicating that the data of the cache 110 is already data output. As there is no change in the content of cache 110, the cache management unit 21 may choose not to perform anything on the address information history.

After outputting the data from the cache 110 to the temporary storage buffer 40, the NAND I/F 20 may input the normal read command to the NAND memory chip 100, pre-fetch the data assumed to be read out next, and record the address of the pre-fetched data as the address information history. Specifically, the following operation is executed.

The NAND I/F 20 transmits a read command ("00h") notifying to start the readout operation, a pre-fetch address, and a read start command ("30h") notifying to start the internal readout operation to the NAND memory chip 100. These configure the normal read command, as described above. The pre-fetch address may be the succeeding page address, or may be the address explicitly specified from the controller 30.

The NAND memory chip 100 changes the Ry/By signal from Ry to By after receiving the read start command. The data is read out from the position corresponding to the pre-fetch address of the memory cell array 10, and the read data is transferred to the cache 110. The NAND memory chip 100 changes the Ry/By signal from By state to Ry state after storing the read data in the cache 110. The data output is not carried out since the data assumed to be read out next is merely to be prepared in the cache 110. The cache management unit 21 stores the pre-fetch address as the address information history.

Figure 15:
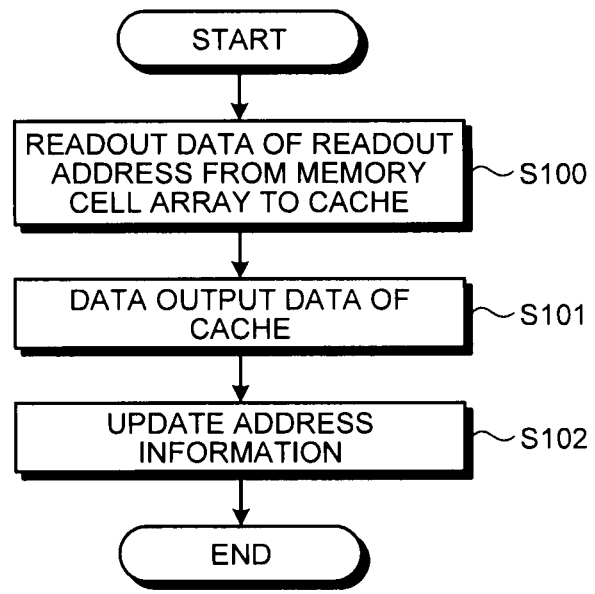
FIG. 15 is a flowchart illustrating the operation of the memory system of when the address determination is a miss.

The operation of the memory system 1 in the case of "miss" (step S86 of FIG. 13) is illustrated in the flowchart of FIG. 15.

The NAND I/F 20 transmits the read command ("00h") notifying to start the readout operation, a readout page address, and a read start command ("30h") notifying to start the internal readout operation to the NAND memory chip 100. These configure the normal read command, as described above. After receiving the read start command, the NAND memory chip 100 changes the R/By signal from Ry to By. The data is then read out from the position corresponding to the readout page address of the memory cell array 10, and the read data is transferred to the cache 110. The NAND memory chip 100 changes the Ry/By state from By state to Ry state after storing the read data in the cache 110 (step S100).

The NAND I/F 20 issues the command (e.g., "05h"-column address-"E0h") for outputting the data of a range corresponding to the readout address of the data of the page size held in the cache 110 from the cache 110 with respect to the NAND memory chip 100. Upon receiving the input of the /RE clock, the NAND memory chip 100 outputs the data of the range corresponding to the specified column address from the cache 110. The NAND I/F 20 transfers the data output from the NAND memory chip 100 to the temporary storage buffer 40 (step S101). When outputting the data from the head of the page address, the /RE clock may be toggled without command input.

Lastly, the cache management unit 21 updates the address information history to the physical address (page address) corresponding to the data newly held in the cache 110 (step S102).

Similar to the case of "hit (case 0)", the NAND I/F 20 may input the normal read command to the NAND memory chip 100, pre-fetch the data assumed to be read out next, and record the address of the pre-fetched data as the address information history after outputting the data from the cache 12 to the temporary storage buffer 40. In this case, the cache management unit 21 stores the pre-fetch address as the address information history.

Figure 16:
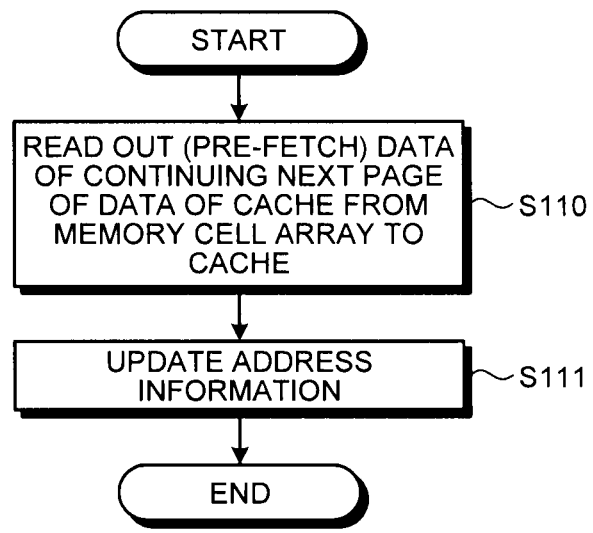
FIG. 16 is a flowchart illustrating the operation of the memory system at the time of pre-fetching.

The flowchart of when the NAND I/F 20 is explicitly instructed to perform the execution of pre-fetching from the higher order module such as the controller 30 without the readout request to the temporary storage buffer 40 is illustrated in FIG. 16.

The NAND I/F 20 transmits the read command ("00h") notifying to start the readout operation, a pre-fetch address, and a read start command ("30h") notifying to start the internal readout operation to the NAND memory chip 100. These configure the normal read command, as described above. The pre-fetch address may be the succeeding page address or may be the address explicitly specified from the controller 30. FIG. 16 illustrates a case of pre-fetching the data of the succeeding page address.

After receiving the read start command, the NAND memory chip 100 changes the R/By signal from Ry to By. The data is then read out from the position corresponding to the pre-fetch address of the memory cell array 10, and the read data is transferred to the cache 110 (step S110). The NAND memory chip 100 changes the Ry/By signal from By state to Ry state after storing the data read out from the page N in the data cache 12. The data stored in the cache 110 is not output to outside since the data requested to be pre-fetched merely needs to be prepared in the data cache 12.

Lastly, the cache management unit 21 updates the address information history to the physical address (page address) corresponding to the data newly held in the cache 110 through pre-fetching (step S111).

Therefore, the data already read out from the memory cell array 10 to the cache 110 can be read out at high speed without access to the memory cell array 10 since the page address (address information history) of the data cached in the cache 110 is stored in the cache management unit 21 expecting to be reused at the time of readout.

When pre-fetching the data corresponding to the succeeding page address to the cache 110 after outputting the data stored in the cache 110 to the temporary storage buffer 40, the data can be read out at high speed without access to the memory cell array 10 if the next readout address is a hit to the page address (pre-fetch address) of the pre-fetched data.

In the first to third embodiments, a case in which the cache is one or two cache regions has been described, but may be three or more cache regions. The memory cell in the NAND memory chip may be divided into a plurality of regions (Plane/District), and each divided memory cell may include the cache region. Furthermore, a plurality of NAND memory chips may exist in the memory system, and the cache region may be provided for every NAND memory chip. Effects similar to the above can be obtained even if there are three or more cache regions by managing the address of the data read out from the memory cell array to the cache region and by performing data readout process in advance from the memory cell array if the data of the next page that is data transferred does not exist in the cache region.

Fourth Embodiment

The configuration of the memory system 1 of the present embodiment is similar to FIG. 1. In the present embodiment, the write control unit 33 of the controller 30 writes the data so as to create a state in which the possibility of being read out continuously is high with respect to the continuing page in the physical block of the memory cell array 10 at the time of write of the data to the memory cell array 10. For instance, the data is arranged in the order arrived from in the memory system 1 from the host device 60. In other words, the data is written in the page order of the physical block of the memory cell array 10 in the order received from the host device 60. This is because there is a possibility of reading out in the write order from the host device 60.

The data is recorded in the order of LBA (logical address) or the address used by the host device 60. In other words, the data stored in the LBA order is written in the page order of the physical block. This is because the request from the host device 60 is often issued continuously in the LBA order. Furthermore, in this case, when sorting the data received from the host device 60 in the LBA order and writing the same, the write may be controlled such that the continuing data of one or more pages, combining the data read out from the NAND memory chip other than the data received from the host device 60, are lined in the LBA order. Similarly, the copy process may be controlled such that the data of one or more pages are lined in the LBA order when carrying out the internal data copy process.

Moreover, a state in which the possibility of being read out continuously is high can be created with respect to the continuing page in the physical block even when a plurality of NAND memory chips 100 to 400 are arranged as illustrated in FIG. 1. In this case, the write interleaved over the NAND memory chips 100 to 400 is sometimes carried out, but the data merely needs to be written in the arrived order or the LBA order in view of interleaving.

The readout operation described in the first to third embodiments is executed in the state in which the data is written in such order. The cache hit rate at the time of readout address determination is thereby enhanced.

Fifth Embodiment

Figure 17:
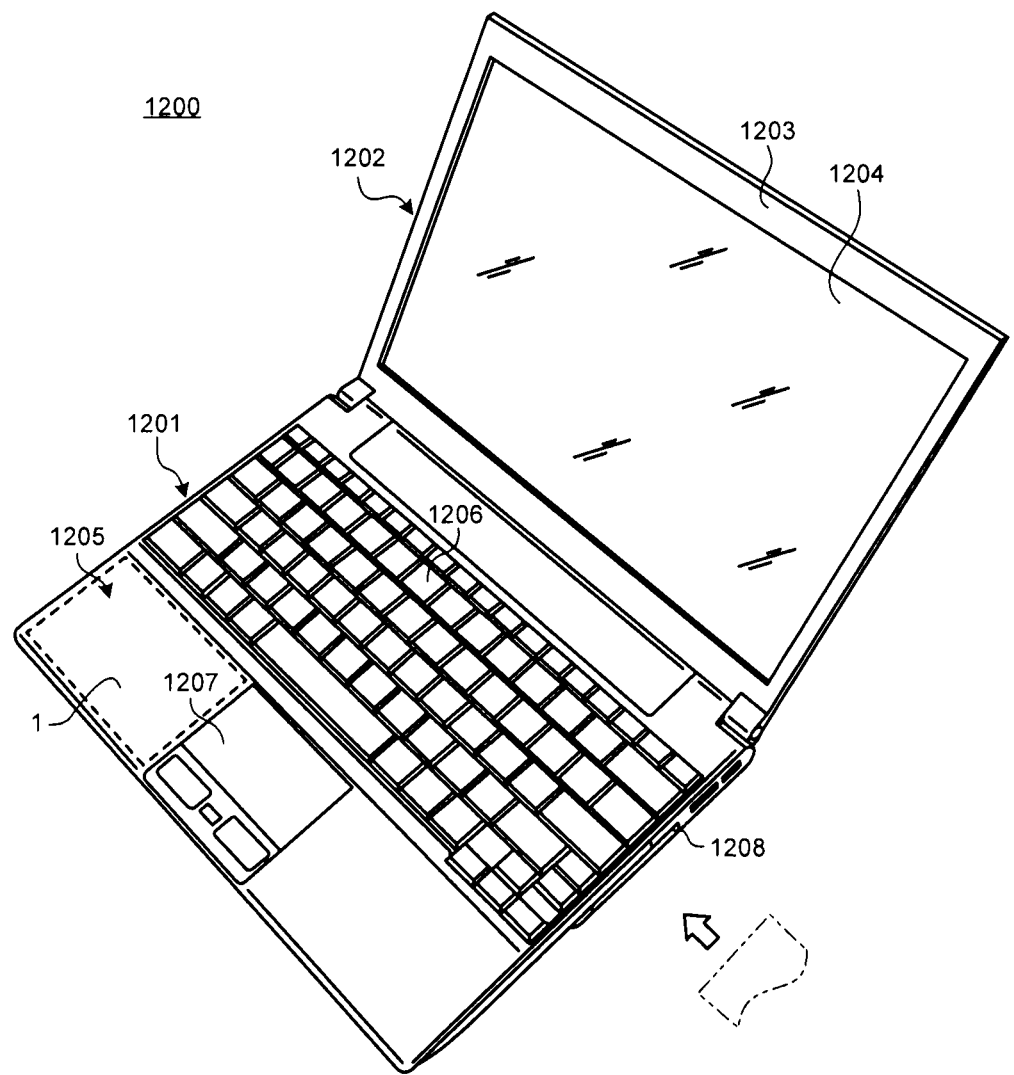
FIG. 17 is a perspective view illustrating an outer appearance of a personal computer.

FIG. 17 is a perspective view illustrating one example of a personal computer 1200 mounted with the memory system 1. The personal computer 1200 includes a main body 1201 and a display unit 1202. The display unit 1202 includes a display housing 1203 and a display device 1204 accommodated in the display housing 1203.

The main body 1201 includes a housing 1205, a keyboard 1205, and a touch pad 1207 or a pointing device. A main circuit substrate, an ODD (Optical Disk Device) unit, a card slot, the memory system 1, and the like are accommodated inside the housing 1205.

The card slot is arranged adjacent to the peripheral wall of the housing 1205. The peripheral wall includes an opening 1208 facing the card slot. The user can insert and remove an additional device to the card slot from outside the housing 1205 through the opening 1208.

The memory system 1 may used in a state mounted inside the personal computer 1200 or may be used as an additional device in a state inserted to the card slot of the personal computer 1200 as a replacement of the conventional HDD.

Figure 18:
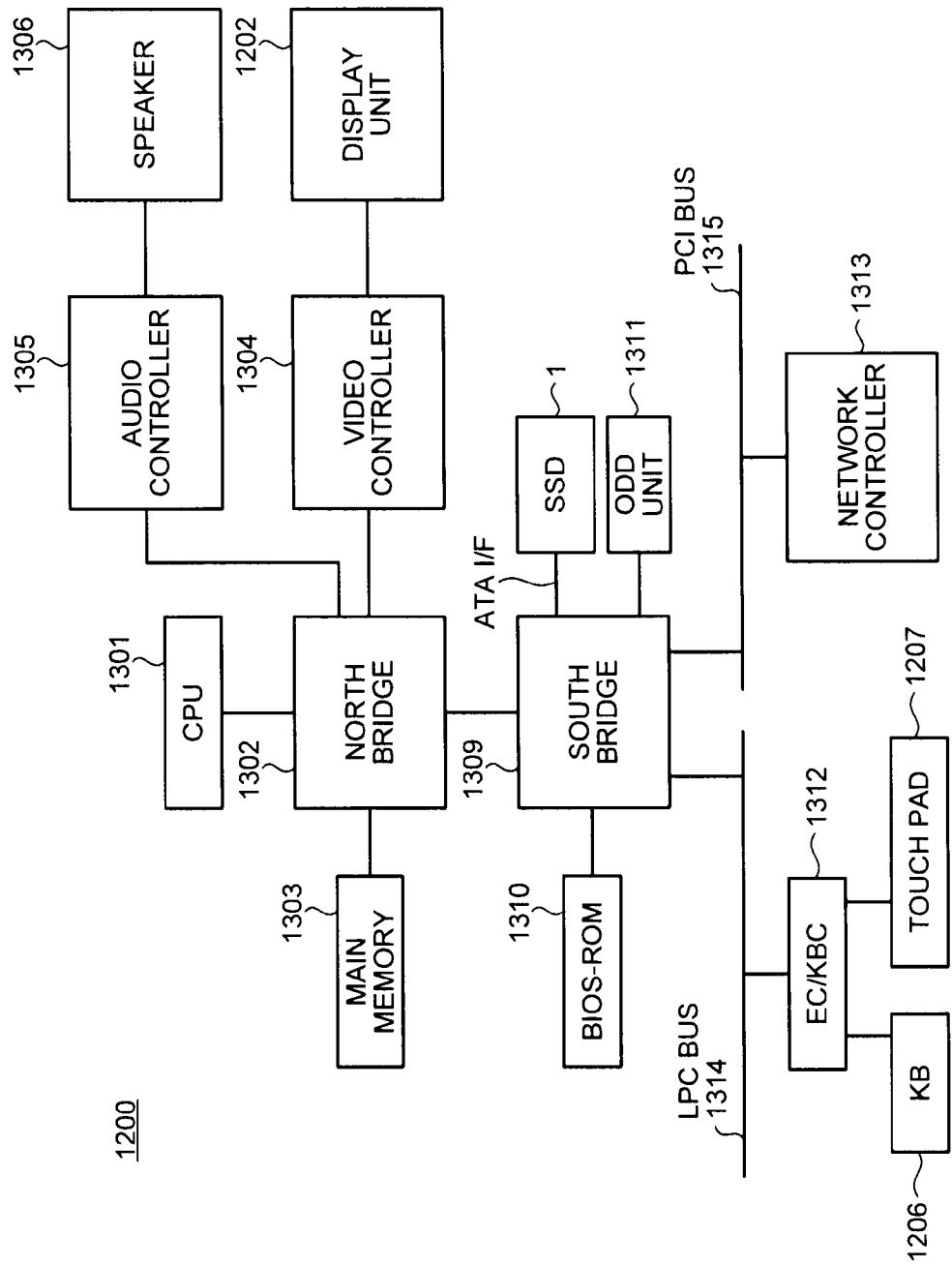
FIG. 18 is a view illustrating a function configuration example of the personal computer.

FIG. 18 illustrates a system configuration example of a personal computer mounted with the SSD. The personal computer 1200 includes a CPU 1301, a north bridge 1302, a main memory 1303, a video controller 1304, an audio controller 1305, a south bridge 1309, a BIOS-ROM 1310, a memory system 1, an ODD unit 1311, an embedded controller/keyboard controller IC (EC/KBC) 1312, a network controller 1303, and the like.

The CPU 1301 is a processor arranged to control the operation of the personal computer 1200, and executes the operating system (OS) loaded from the memory system 1 to the main memory 1303. Furthermore, when the ODD unit 1331 enables the execution of at least one process of the readout process and the write process with respect to the attached optical disc, the CPU 1301 executes such processes.

Moreover, the CPU 1301 executes the system BIOS (Basic Input Output System) stored in the BIOS-ROM 1310. The system BIOS is a program for hardware control in the personal computer 1200.

The north bridge 1302 is a bridge device for connecting the local bus of the CPU 1301 and the south bridge 1309. The north bridge 1302 incorporates a memory controller for access controlling the main memory 1303.

The north bridge 1302 also has a function of executing the communication with the video controller 1304, and the communication with the audio controller 1305 through an AGP (Accelerated Graphics Port) bus or the like.

The main memory 1303 temporarily stores programs and data, and functions as a work area of the CPU 1301. The main memory 1303 is configured by a RAM, or the like.

The video controller 1304 is a video reproduction controller for controlling the display unit 1202 used as a display monitor of the personal computer 1200.

The audio controller 1305 is an audio reproduction controller for controlling the speaker 1306 of the personal computer 1200.

The south bridge 1309 controls each device on the LPC (Low Pin Count) bus 1314 and each device on the PCI (Peripheral Component Interconnect) bus 1315. The south bridge 1309 controls the memory system 1 or the storage device for storing various types of software and data through an ATA interface.

The personal computer 1200 carries out access to the memory system 1 in units of sectors. The write command, the readout command, the cache flash command, and the like are input to the memory system 1 through the ATA interface.

The south bridge 1309 also has a function of access controlling the BIOS-ROM 1310, and the ODD unit 1311.

The EC/KBC 1312 is a one-chip microcomputer in which an embedded controller for power management and a keyboard controller for controlling a keyboard (KB) 1206 and a touch pad 1207 are integrated.

The EC/KBC 1312 has a function of turning ON/OFF the power of the personal computer 1200 according to the operation of the power button by the user. The network controller 1313 is a communication device for executing the communication with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;
a controller configured to issue a readout request including a readout address that specifies the physical address on the memory cell array to the memory interface; and
a buffer memory configured to temporarily hold the data read out from the memory chip;
wherein the controller issues a pre-fetch request including a pre-fetch address specifying the physical address on the memory cell array to the memory interface; and
the memory interface
transfers the data held in the first cache region to the buffer memory without reading out the data corresponding to the readout address from the memory cell array if the readout address matches the first address information history,
transfers the data held in the second cache region to the buffer memory without reading out the data corresponding to the readout address from the memory cell array if the readout address matches the second address information history,
reads out the data corresponding to the readout address from the memory cell array and transfers the data to the buffer memory if the readout address does not match either one of the first or second address information histories,
terminates a process of the pre-fetch request without reading out data corresponding to the pre-fetch address from the memory cell array if the pre-fetch address matches the first or second address information history, and
pre-fetches the data corresponding to the pre-fetch address from the memory cell array to the first or second cache region if the pre-fetch address does not match either one of the first or second address information history.

2. The memory system according to claim 1, wherein the memory interface pre-fetches the data of the physical address succeeding the readout address from the memory cell array to the first or second cache region when receiving a readout request from the controller.

3. The memory system according to claim 1, wherein the memory interface pre-fetches the data of the physical address specified by the controller from the memory cell array to the first or second cache region when receiving a readout request from the controller.

4. The memory system according to claim 1, wherein the memory interface pre-fetches the data of the physical address succeeding the pre-fetch address from the memory cell array to the first or second cache region in addition to the data corresponding to the pre-fetch address when receiving the pre-fetch request from the controller.

5. The memory system according to claim 1, wherein the memory interface pre-fetches the data of the physical address specified by the controller from the memory cell array to the first or second cache region in addition to the data corresponding to the pre-fetch address when receiving the pre-fetch request from the controller.

6. The memory system according to claim 1, wherein the first cache region temporarily holds the data read out from the memory cell array, the second cache region temporarily holds the data transferred from the first cache region, and the buffer memory temporarily holds the data transferred from the second cache region.

7. The memory system according to claim 6, wherein the memory interface does not execute pre-fetching from the memory cell array to the first cache region if the readout address matches the second address information history.

8. The memory system according to claim 1, wherein the controller transforms a logical address contained in a readout command received from the host device to a physical address on the memory cell array, and issues a readout request including the physical address to the memory interface.

9. The memory system according to claim 1, wherein the memory interface manages the physical address corresponding to the data held in the first and second cache regions as the first and second address information histories when writing data of a predetermined size in the memory cell array.

10. The memory system according to claim 1, wherein the controller aligns write data received from the host device in the received order, and performs write from the head data of the aligned write data in the order of the physical address on the memory cell array.

11. The memory system according to claim 1, wherein the controller aligns write data received from the host device in the order of logical address, and performs write from the head data of the aligned write data in the order of the physical address on the memory cell array.

12. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;
a controller configured to issue a readout request including a readout address that specifies the physical address on the memory cell array to the memory interface; and
a buffer memory configured to temporarily hold the data read out from the memory chip;
wherein the first cache region temporarily holds the data read out from the memory cell array, the second cache region temporarily holds the data transferred from the first cache region, the buffer memory temporarily holds the data transferred from the second cache region, and
the memory interface
transfers the data held in the first cache region to the buffer memory without reading out the data corresponding to the readout address from the memory cell array if the readout address matches the first address information history,
transfers the data held in the second cache region to the buffer memory without reading out the data corresponding to the readout address from the memory cell array if the readout address matches the second address information history,
reads out the data corresponding to the readout address from the memory cell array and transfers the data to the buffer memory if the readout address does not match either one of the first or second address information histories,
transfers the data held in the first cache region to the buffer memory through the second cache region, and further pre-fetches the data of the physical address succeeding the readout address from the memory cell array to the first cache region if the readout address matches the first address information history.

13. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;
a controller configured to issue a readout request including a readout address that specifies the physical address on the memory cell array to the memory interface; and
a buffer memory configured to temporarily hold the data read out from the memory chip;
wherein the first cache region temporarily holds the data read out from the memory cell array, the second cache region temporarily holds the data transferred from the first cache region, the buffer memory temporarily holds the data transferred from the second cache region, and
the memory interface
transfers the data held in the first cache region to the buffer memory without reading out the data corresponding to the readout address from the memory cell array if the readout address matches the first address information history,
transfers the data held in the second cache region to the buffer memory without reading out the data corresponding to the readout address from the memory cell array if the readout address matches the second address information history,
reads out the data corresponding to the readout address from the memory cell array and transfers the data to the buffer memory if the readout address does not match either one of the first or second address information histories,
transfers the data held in the first cache region to the buffer memory through the second cache region, and further pre-fetches the data of the physical address specified by the controller from the memory cell array to the first cache region if the readout address matches the first address information history.

14. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;

a controller configured to issue a readout request including a readout address that specifies the physical address on the memory cell array to the memory interface; and a buffer memory configured to temporarily hold the data read out from the memory chip;

wherein the first cache region temporarily holds the data read out from the memory cell array, the second cache region temporarily holds the data transferred from the first cache region, the buffer memory temporarily holds the data transferred from the second cache region, and the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, transfers the data read out from the memory cell array to the buffer memory through the first and second cache regions, and further pre-fetches the data of the physical address succeeding the readout address from the memory cell array to the first cache region if the readout address does not match either one of the first or second address information history.

15. A memory system comprising:

a memory chip including a nonvolatile memory cell array and first and second cache regions configured to temporarily hold data of a predetermined size read out from the memory cell array;

a memory interface configured to manage a first address information history which is a physical address on the memory cell array in which the data held in the first cache region is stored and a second address information history which is a physical address on the memory cell array in which the data held in the second cache region is stored;

a controller configured to issue a readout request including a readout address that specifies the physical address on the memory cell array to the memory interface; and a buffer memory configured to temporarily hold the data read out from the memory chip;

wherein the first cache region temporarily holds the data read out from the memory cell array, the second cache region temporarily holds the data transferred from the first cache region, the buffer memory temporarily holds the data transferred from the second cache region, and the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, transfers the data read out from the memory cell array to the buffer memory through the first and second cache regions, and further pre-fetches the data of the physical address specified by the controller from the memory cell array to the first cache region if the readout address does not match either one of the first or second address information history.

16. A memory system comprising:

a memory chip including a nonvolatile memory cell array and first and second cache regions configured to temporarily hold data of a predetermined size read out from the memory cell array;

a memory interface configured to manage a first address information history which is a physical address on the memory cell array in which the data held in the first cache region is stored and a second address information history which is a physical address on the memory cell array in which the data held in the second cache region is stored;

a controller configured to issue a readout request including a readout address that specifies the physical address on the memory cell array to the memory interface; and a buffer memory configured to temporarily hold the data read out from the memory chip;

wherein the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, pre-fetches the data of the physical address succeeding the readout address from the memory cell array to the first or second cache region when receiving a readout request from the controller, and has a function of canceling the pre-fetching according to an instruction of the controller.

17. The memory system according to claim 16, wherein the controller cancels the pre-fetching with respect to the memory interface when determined that the readout request from the host device is a random access.

18. The memory system according to claim 17, wherein the controller determines as the random access if the data size specified in the readout request from the host device is smaller than or equal to a predetermined threshold value.

19. The memory system according to claim 17, wherein the controller determines as the random access if the logical addresses specified in a plurality of readout requests from the host device are not continued with respect to each other.

20. The memory system according to claim 17, wherein the controller determines as the random access if a number of queuing of a command issued from the host device is greater than or equal to a predetermined threshold value.

21. The memory system according to claim 16, wherein the controller does not cancel the pre-fetching with respect to the memory interface when determined that the readout request from the host device is a sequential access.

22. The memory system according to claim 21, wherein the controller determines as the sequential access if the data size specified in the readout request from the host device is greater than or equal to a predetermined threshold value.

23. The memory system according to claim 21, wherein the controller determines as the sequential access if the logical addresses specified in a plurality of readout requests from the host device are continued with respect to each other.

24. The memory system according to claim 21, wherein the controller determines as the sequential access if a number of queuing of a command issued from the host device is smaller than or equal to a predetermined threshold value.

25. A memory system comprising:
a memory chip including a nonvolatile memory cell array and a cache region configured to temporarily hold data of a predetermined size read out from the memory cell array;
a memory interface configured to manage an address information history which is a physical address on the memory cell array in which the data held in the cache region is stored;
a controller configured to issue a readout request including a readout address that specifies the physical address on the memory cell array to the memory interface; and
a buffer memory configured to temporarily hold the data read out from the memory chip; wherein
the memory interface
transfers the data held in the cache region to the buffer memory without reading out the data corresponding to the readout address from the memory cell array if the readout address matches the address information history,
reads out the data corresponding to the readout address from the memory cell array and transfers the data to the buffer memory if the readout address does not match the address information history, and
pre-fetches the data of the physical address succeeding the readout address from the memory cell array to the cache region after transferring the data read out from the memory cell array to the buffer memory through the cache region if the readout address does not match the address information history.

26. The memory system according to claim 25, wherein the memory interface pre-fetches the data of the physical address succeeding the readout address from the memory cell array to the cache region after transferring the data held in the cache region to the buffer memory if the readout address matches the address information history.

27. The memory system according to claim 25, wherein the memory interface pre-fetches the data of the physical address specified by the controller from the memory cell array to the cache region after transferring the data held in the cache region to the buffer memory if the readout address matches the address information history.

28. The memory system according to claim 25, wherein the controller transforms a logical address contained in a readout command received from the host device to a physical address on the memory cell array, and issues a readout request including the physical address to the memory interface.

29. The memory system according to claim 25, wherein the controller aligns write data received from the host device in the received order, and performs write from the head data of the aligned write data in the order of the physical address on the memory cell array.

30. The memory system according to claim 25, wherein the controller aligns write data received from the host device in the order of logical address, and performs write from the head data of the aligned write data in the order of the physical address on the memory cell array.

31. A memory system comprising:
a memory chip including a nonvolatile memory cell array and a cache region configured to temporarily hold data of a predetermined size read out from the memory cell array;
a memory interface configured to manage an address information history which is a physical address on the memory cell array in which the data held in the cache region is stored;
a controller configured to issue a readout request including a readout address that specifies the physical address on the memory cell array to the memory interface; and
a buffer memory configured to temporarily hold the data read out from the memory chip; wherein
the memory interface
transfers the data held in the cache region to the buffer memory without reading out the data corresponding to the readout address from the memory cell array if the readout address matches the address information history,
reads out the data corresponding to the readout address from the memory cell array and transfers the data to the buffer memory if the readout address does not match the address information history, and
pre-fetches the data of the physical address specified by the controller from the memory cell array to the cache region after transferring the data read out from the memory cell array to the buffer memory through the cache region if the readout address does not match the address information history.

32. A memory system comprising:
a memory chip including a nonvolatile memory cell array and a cache region configured to temporarily hold data of a predetermined size read out from the memory cell array;
a memory interface configured to manage an address information history which is a physical address on the memory cell array in which the data held in the cache region is stored;
a controller configured to issue a readout request including a readout address that specifies the physical address on the memory cell array to the memory interface; and
a buffer memory configured to temporarily hold the data read out from the memory chip; wherein
the controller issues a pre-fetch request including a pre-fetch address specifying the physical address on the memory cell array to the memory interface; and
the memory interface transfers the data held in the cache region to the buffer memory without reading out the data corresponding to the readout address from the memory cell array if the readout address matches the address information history,
reads out the data corresponding to the readout address from the memory cell array and transfers the data to the buffer memory if the readout address does not match the address information history,
terminates a process of the pre-fetch request without reading out data corresponding to the pre-fetch address from the memory cell array if the pre-fetch address matches the address information history, and pre-fetches the data corresponding to the pre-fetch address from the memory cell array to the cache region if the pre-fetch address does not match the address information history.

33. A memory system comprising:
a memory chip including a nonvolatile memory cell array and a cache region configured to temporarily hold data of a predetermined size read out from the memory cell array;
a memory interface configured to manage an address information history which is a physical address on the memory cell array in which the data held in the cache region is stored;
a controller configured to issue a readout request including a readout address that specifies the physical address on the memory cell array to the memory interface; and
a buffer memory configured to temporarily hold the data read out from the memory chip; wherein
the memory interface
transfers the data held in the cache region to the buffer memory without reading out the data corresponding to the readout address from the memory cell array if the readout address matches the address information history,
reads out the data corresponding to the readout address from the memory cell array and transfers the data to the buffer memory if the readout address does not match the address information history,
pre-fetches the data of the physical address succeeding the readout address from the memory cell array to the cache region after transferring the data held in the cache region to the buffer memory if the readout address matches the address information history, and
has a function of canceling the pre-fetching according to an instruction of the controller.

34. The memory system according to claim 33, wherein the controller cancels the pre-fetching with respect to the memory interface when determined that the readout request from the host device is a random access.

35. The memory system according to claim 34, wherein the controller determines as the random access if the data size specified in the readout request from the host device is smaller than or equal to a predetermined threshold value.

36. The memory system according to claim 34, wherein the controller determines as the random access if the logical addresses specified in a plurality of readout requests from the host device are not continued with respect to each other.

37. The memory system according to claim 34, wherein the controller determines as the random access if a number of queuing of a command issued from the host device is greater than or equal to a predetermined threshold value.

38. The memory system according to claim 33, wherein the controller does not cancel the pre-fetching with respect to the memory interface when determined that the readout request from the host device is a sequential access.

39. The memory system according to claim 38, wherein the controller determines as the sequential access if the data size specified in the readout request from the host device is greater than or equal to a predetermined threshold value.

40. The memory system according to claim 38, wherein the controller determines as the sequential access if the logical addresses specified in a plurality of readout requests from the host device are continued with respect to each other.

41. The memory system according to claim 38, wherein the controller determines as the sequential access if a number of queuing of a command issued from the host device is smaller than or equal to a predetermined threshold value.

42. The memory system according to claim 38, wherein the memory interface manages the physical address corresponding to the data held in the first and second cache regions as the first and second address information histories when writing data of a predetermined size in the memory cell array.

43. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;
a controller configured to issue a readout request including a readout address that specifies the physical address on the memory cell array to the memory interface; and
a buffer memory configured to temporarily hold the data read out from the memory chip;
wherein the controller issues a pre-fetch request including a pre-fetch address specifying the physical address on the memory cell array to the memory interface; and
the memory interface
transfers the data held in the first cache region to the buffer memory without reading out the data corresponding to the readout address from the memory cell array if the readout address matches the first address information history,
transfers the data held in the second cache region to the buffer memory without reading out the data corresponding to the readout address from the memory cell array if the readout address matches the second address information history,
reads out the data corresponding to the readout address from the memory cell array and transfers the data to the buffer memory if the readout address does not match either one of the first or second address information histories, and
terminates a process of the pre-fetch request without reading out data corresponding to the pre-fetch address from the memory cell array if the pre-fetch address matches the first or second address information history.

44. A memory system comprising:
a memory chip including a nonvolatile memory cell array and first and second cache regions configured to temporarily hold data of a predetermined size read out from the memory cell array;
a memory interface configured to manage a first address information history which is a physical address on the memory cell array in which the data held in the first cache region is stored and a second address information history which is a physical address on the memory cell array in which the data held in the second cache region is stored;
a controller configured to issue a readout request including a readout address that specifies the physical address on the memory cell array to the memory interface; and
a buffer memory configured to temporarily hold the data read out from the memory chip;
wherein the controller issues a pre-fetch request including a pre-fetch address specifying the physical address on the memory cell array to the memory interface; and the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, and pre-fetches the data corresponding to the pre-fetch address from the memory cell array to the first or second cache region if the pre-fetch address does not match either one of the first or second address information history.

45. A memory system comprising:

a memory chip including a nonvolatile memory cell array and first and second cache regions configured to temporarily hold data of a predetermined size read out from the memory cell array;

a memory interface configured to manage a first address information history which is a physical address on the memory cell array in which the data held in the first cache region is stored and a second address information history which is a physical address on the memory cell array in which the data held in the second cache region is stored;

a controller configured to issue a readout request including a readout address that specifies the physical address on the memory cell array to the memory interface; and a buffer memory configured to temporarily hold the data read out from the memory chip;

wherein the first cache region temporarily holds the data read out from the memory cell array, the second cache region temporarily holds the data transferred from the first cache region, the buffer memory temporarily holds the data transferred from the second cache region, and the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, transfers the data held in the first cache region to the buffer memory through the second cache region, and further pre-fetches the data from the memory cell array to the first cache region if the readout address matches the first address information history.

46. A memory system comprising:

a memory chip including a nonvolatile memory cell array and first and second cache regions configured to temporarily hold data of a predetermined size read out from the memory cell array;

a memory interface configured to manage a first address information history which is a physical address on the memory cell array in which the data held in the first cache region is stored and a second address information history which is a physical address on the memory cell array in which the data held in the second cache region is stored;

a controller configured to issue a readout request including a readout address that specifies the physical address on the memory cell array to the memory interface; and a buffer memory configured to temporarily hold the data read out from the memory chip;

wherein the first cache region temporarily holds the data read out from the memory cell array, the second cache region temporarily holds the data transferred from the first cache region, the buffer memory temporarily holds the data transferred from the second cache region, and the memory interface transfers the data held in the first cache region to the buffer memory without reading out the data corresponding to the readout address from the memory cell array if the readout address matches the first address information history, transfers the data held in the second cache region to the buffer memory without reading out the data corresponding to the readout address from the memory cell array if the readout address matches the second address information history, reads out the data corresponding to the readout address from the memory cell array and transfers the data to the buffer memory if the readout address does not match either one of the first or second address information histories, transfers the data read out from the memory cell array to the buffer memory through the first and second cache regions, and further pre-fetches the data from the memory cell array to the first cache region if the readout address does not match either one of the first or second address information history.

* * * * *